United States Patent
Gee et al.

(10) Patent No.: US 12,248,892 B1
(45) Date of Patent: Mar. 11, 2025

(54) TECHNIQUES FOR LEAD INFORMATION SHARING

(71) Applicant: Vivint, Inc., Provo, UT (US)

(72) Inventors: Ryan Gee, Cedar Hills, UT (US); David Jones, Lehi, UT (US); Nicholas Rosenvall, Alpine, UT (US)

(73) Assignee: Vivint LLC, Provo, UT (US)

( * ) Notice: Subject to any disclaimer, the term of this patent is extended or adjusted under 35 U.S.C. 154(b) by 75 days.

(21) Appl. No.: 16/786,339

(22) Filed: Feb. 10, 2020

(51) Int. Cl.
  *G06Q 10/0631* (2023.01)
  *G06Q 10/0639* (2023.01)

(52) U.S. Cl.
  CPC .......... *G06Q 10/063112* (2013.01); *G06Q 10/06398* (2013.01)

(58) Field of Classification Search
  CPC ............. G06Q 10/063112; G06Q 10/06398
  See application file for complete search history.

(56) References Cited

U.S. PATENT DOCUMENTS

| | | | |
|---|---|---|---|
| 6,591,253 B1 * | 7/2003 | Dinkin | G06Q 30/04 705/412 |
| 6,654,732 B1 | 11/2003 | Naito et al. | |
| 6,748,343 B2 | 6/2004 | Alexander et al. | |
| 7,193,644 B2 | 3/2007 | Carter | |
| 7,956,739 B2 | 6/2011 | Hong et al. | |
| 8,139,095 B2 | 3/2012 | Carter | |
| 8,144,183 B2 | 3/2012 | Carter | |
| 8,144,184 B2 | 3/2012 | Carter | |
| 8,154,581 B2 | 4/2012 | Carter | |
| 8,164,614 B2 | 4/2012 | Carter | |
| 9,160,851 B2 * | 10/2015 | Kugler | G06Q 30/0201 |
| 9,414,030 B2 | 8/2016 | Carter | |
| 9,432,638 B2 | 8/2016 | Carter | |
| 9,485,478 B2 | 11/2016 | Carter | |
| 9,516,284 B2 | 12/2016 | Carter | |
| 9,648,290 B2 | 5/2017 | Carter | |
| 9,653,323 B2 | 5/2017 | Chew et al. | |
| 9,930,175 B2 * | 3/2018 | Jain | H04M 3/51 |
| 10,674,120 B2 | 6/2020 | Carter | |
| 10,986,717 B1 | 4/2021 | Fu et al. | |

(Continued)

OTHER PUBLICATIONS

"Properties of referral networks: Emergence of authority and trust"; Yolum, Pinar; ProQuest Dissertations and Theses; ProQuest Dissertations Publishing. (Jun. 2003) (Year: 2003).*

(Continued)

*Primary Examiner* — Dylan C White
(74) *Attorney, Agent, or Firm* — Nolte Lackenbach Siegel; N. Alexander Nolte

(57) ABSTRACT

The described features generally relate to improved methods, systems, and devices for techniques for lead information sharing. A device may transmit a first message indicating a person (i.e., a lead) identified by a setting representative. The first message may include one or more scores of the person, the setting representative, or both. The device may receive a second message indicating a request for information of the person. The second message may include a score of a closing representative. The device may identify that the closing representative is selected for sending the information of the person. The device may transmit a third message indicating that the closing representative is selected. The third message may include the information of the person.

20 Claims, 9 Drawing Sheets

(56) References Cited

U.S. PATENT DOCUMENTS

| | | |
|---|---|---|
| 11,164,196 B1* | 11/2021 | Gee .................. G06Q 10/04 |
| 11,195,398 B1 | 12/2021 | Fu et al. |
| 11,581,099 B1 | 2/2023 | Rufo et al. |
| 11,888,801 B2* | 1/2024 | Matsuoka ............ H04L 51/212 |
| 2002/0070859 A1 | 6/2002 | Gutta et al. |
| 2002/0086660 A1 | 7/2002 | Sullivan et al. |
| 2003/0117280 A1 | 6/2003 | Prehn |
| 2003/0118216 A1 | 6/2003 | Goldberg |
| 2005/0176400 A1 | 8/2005 | Mullet et al. |
| 2005/0281435 A1 | 12/2005 | Aggarwal |
| 2006/0041500 A1* | 2/2006 | Diana .................. G06Q 40/04 |
| | | 705/37 |
| 2009/0048859 A1* | 2/2009 | McCarthy ............ G06Q 30/02 |
| | | 705/346 |
| 2009/0299825 A1 | 12/2009 | Olawski et al. |
| 2009/0299854 A1 | 12/2009 | Olawski et al. |
| 2010/0082174 A1 | 4/2010 | Weaver et al. |
| 2010/0289643 A1 | 11/2010 | Trundle et al. |
| 2011/0054973 A1 | 3/2011 | Deich et al. |
| 2012/0023145 A1 | 1/2012 | Brannon et al. |
| 2012/0284777 A1 | 11/2012 | Eugenio et al. |
| 2012/0316690 A1 | 12/2012 | Li et al. |
| 2014/0015981 A1 | 1/2014 | Dietl |
| 2014/0266681 A1 | 9/2014 | Small |
| 2014/0278028 A1 | 9/2014 | Nye et al. |
| 2014/0282048 A1 | 9/2014 | Shapiro et al. |
| 2014/0324192 A1 | 10/2014 | Baskaran et al. |
| 2015/0039105 A1 | 2/2015 | Lee et al. |
| 2015/0088329 A1 | 3/2015 | Thiruvengada et al. |
| 2015/0108901 A1 | 4/2015 | Greene et al. |
| 2015/0228006 A1* | 8/2015 | Malone ............ G06Q 10/06393 |
| | | 705/7.39 |
| 2015/0228419 A1 | 8/2015 | Fadell et al. |
| 2016/0142407 A1 | 5/2016 | Chun et al. |
| 2016/0253706 A1* | 9/2016 | Kursar ............... G06Q 30/0613 |
| | | 705/14.58 |
| 2016/0255139 A1* | 9/2016 | Rathod ................ H04L 51/046 |
| | | 709/203 |
| 2016/0261425 A1 | 9/2016 | Horton et al. |
| 2016/0274230 A1 | 9/2016 | Wu et al. |
| 2016/0350654 A1 | 12/2016 | Lee et al. |
| 2017/0262706 A1 | 9/2017 | Sun et al. |
| 2017/0331953 A1* | 11/2017 | Jain ..................... H04M 3/4365 |
| 2018/0035901 A1 | 2/2018 | Cronin et al. |
| 2018/0047274 A1 | 2/2018 | Miwa |
| 2018/0114420 A1 | 4/2018 | Siminoff et al. |
| 2018/0165933 A1 | 6/2018 | Siminoff |
| 2018/0189913 A1 | 7/2018 | Knopp et al. |
| 2018/0240454 A1 | 8/2018 | Raj et al. |
| 2018/0294047 A1 | 10/2018 | Hosseini et al. |
| 2018/0341835 A1 | 11/2018 | Siminoff |
| 2019/0052701 A1* | 2/2019 | Rathod ................. H04L 67/22 |
| 2019/0087646 A1 | 3/2019 | Goulden et al. |
| 2019/0108404 A1 | 4/2019 | Xu |
| 2019/0156601 A1 | 5/2019 | Sinha et al. |
| 2019/0327448 A1 | 10/2019 | Fu et al. |
| 2020/0180506 A1 | 6/2020 | Nakayama et al. |
| 2021/0056184 A1 | 2/2021 | Modani et al. |
| 2021/0203784 A1* | 7/2021 | Konig .................. G06Q 30/01 |
| 2022/0165036 A1 | 5/2022 | Daley et al. |
| 2023/0077262 A1* | 3/2023 | Matsuoka ............ H04L 51/224 |
| 2023/0186327 A1* | 6/2023 | Robinson ........... G06Q 30/0201 |
| | | 705/7.29 |

OTHER PUBLICATIONS

How the Conflict of Autonomous and Controlled Motivation Influences Sales Controls to Inside Sales Agents' Work Outcomes; Conde, Gonzalo Richard; ProQuest Dissertations and Theses; ProQuest Dissertations Publishing. (Aug. 2019) (Year: 2019).*

Hossain et al., "Adaptive Interaction Support in Ambient-Aware Environments Based on Quality of Context Information" in Multimed tools Appl (2013) 67: pp. 409-432 (Year: 2013).

Unboxing the Ring Video Dorrbell is it Worth it video.

* cited by examiner

TECHNIQUES FOR LEAD INFORMATION SHARING

BACKGROUND

The following relates generally to systems and data processing, and more specifically to techniques for lead information sharing.

A platform (i.e., a computing platform) may be employed by many users to store, manage, and process data using a shared network of remote servers. Users may develop applications on the platform to handle the storage, management, and processing of data. In some cases, the platform may utilize a database system. Users may access the platform using various user devices (e.g., desktop computers, laptops, smartphones, tablets, or other computing systems, etc.).

In some examples, the platform may support sales, services, marketing, community, analytics, and applications. A user may utilize the platform to help manage services, goods, or products provided to the user by a provider. For example, managing services provided by the provider may include analyzing data, storing and preparing communications, tracking opportunities, and tracking sales.

SUMMARY

The described features generally relate to improved methods, systems, and devices for techniques for lead information sharing. A provider may offer products or services to customers through one or more representatives and/or entities. A provider may wish to identify leads (e.g., potential customers) who may be interested in the products or services, who may be unaware of the products or services, or who may otherwise be relatively likely to purchase the products or services after being contacted by representatives of the provider. Such identification may enable the provider to more efficiently utilize resources and representatives to increase sales revenue for the products and services.

The provider may obtain leads from other providers. The providers may be associated with each other and may jointly use a sales platform in order to share lead information associated with potential customers. For example, a "setting" representative (e.g., a representative of another provider) may generate lead information based on an interaction with a customer. The setting representative may send an indication of the lead information to one or more "closing" representatives (e.g., a representative of the provider). The indication may include information associated with the setting representative (e.g., a score of the setting representative), information associated with the lead (e.g., a score of the customer), a requested price for the lead information, a market price for the lead information, among other examples. A closing representative may receive the indication and send a request for the lead information. The request may include information associated with the closing representative (e.g., a score of the closing representative), financial information such as a bid amount, a bid type, among other examples. In some examples, the setting representative may receive requests from the one or more closing representatives and select a closing representative for transmitting the lead information.

A method is described. The method may include transmitting, to one or more devices associated with one or more closing representatives, a first message indicating a person identified by a setting representative, the person associated with a product or service represented by the one or more closing representatives, the first message including a score associated with the person, a score associated with the setting representative, or a combination thereof, receiving, from a device associated with a closing representative of the one or more closing representatives, a second message indicating a request for information of the person based on transmitting the first message, the second message including a score associated with the closing representative, identifying that the closing representative is selected for sending the information of the person based on receiving the second message, and transmitting, to the device associated with the closing representative, a third message indicating that the closing representative is selected and including the information of the person.

An apparatus is described. The apparatus may include a processor, memory in electronic communication with the processor, and instructions stored in the memory. The instructions may be executable by the processor to cause the apparatus to transmit, to one or more devices associated with one or more closing representatives, a first message indicating a person identified by a setting representative, the person associated with a product or service represented by the one or more closing representatives, the first message including a score associated with the person, a score associated with the setting representative, or a combination thereof, receive, from a device associated with a closing representative of the one or more closing representatives, a second message indicating a request for information of the person based on transmitting the first message, the second message including a score associated with the closing representative, identify that the closing representative is selected for sending the information of the person based on receiving the second message, and transmit, to the device associated with the closing representative, a third message indicating that the closing representative is selected and including the information of the person.

Another apparatus is described. The apparatus may include means for transmitting, to one or more devices associated with one or more closing representatives, a first message indicating a person identified by a setting representative, the person associated with a product or service represented by the one or more closing representatives, the first message including a score associated with the person, a score associated with the setting representative, or a combination thereof, means for receiving, from a device associated with a closing representative of the one or more closing representatives, a second message indicating a request for information of the person based on transmitting the first message, the second message including a score associated with the closing representative, means for identifying that the closing representative is selected for sending the information of the person based on receiving the second message, and means for transmitting, to the device associated with the closing representative, a third message indicating that the closing representative is selected and including the information of the person.

A non-transitory computer-readable medium storing code is described. The code may include instructions executable by a processor to transmit, to one or more devices associated with one or more closing representatives, a first message indicating a person identified by a setting representative, the person associated with a product or service represented by the one or more closing representatives, the first message including a score associated with the person, a score associated with the setting representative, or a combination thereof, receive, from a device associated with a closing representative of the one or more closing representatives, a second message indicating a request for information of the person based on transmitting the first message, the second message including a score associated with the closing representative, identify that the closing representative is selected for sending the information of the person based on receiving the second message, and transmit, to the device associated with the closing representative, a third message indicating that the closing representative is selected and including the information of the person.

Some examples of the method, apparatuses, and non-transitory computer-readable medium described herein may further include operations, features, means, or instructions for determining the score associated with the closing representative based on a lead-closed history of the closing representative, a location of the closing representative, a proximity of the closing representative to the person, an entity type of the closing representative, or a combination thereof.

In some examples of the method, apparatuses, and non-transitory computer-readable medium described herein, the lead-closed history of the closing representative includes a number of leads received by the closing representative, a number of leads closed by the closing representative, or a combination thereof.

Some examples of the method, apparatuses, and non-transitory computer-readable medium described herein may further include operations, features, means, or instructions for determining a ratio of a number of leads received by the closing representative to a number of leads closed by the closing representative, and comparing the ratio of the number of leads received to the number of leads closed with an averaged ratio, where determining the score associated with the closing representative may be based on the comparing.

Some examples of the method, apparatuses, and non-transitory computer-readable medium described herein may further include operations, features, means, or instructions for receiving a set of second messages from a set of the one or more closing representatives, each of the set of second messages including a price to pay the setting representative to send the information of the person, where identifying that the closing representative may be selected may be based on the price indicated by the second message associated with the closing representative.

In some examples of the method, apparatuses, and non-transitory computer-readable medium described herein, the price includes a first price for receiving the information of the person, a second price for providing the good or service to the person, or a combination thereof.

Some examples of the method, apparatuses, and non-transitory computer-readable medium described herein may further include operations, features, means, or instructions for determining the score associated with the person based on a proximity of the person to the closing representative, a demographic characteristic, a financial characteristic, a purchase history, a preference associated with the product or service, a consumer interest, personally identifying information, financial information, a use history of the product or service, contact information, a credit history, a qualification, or a combination thereof.

Some examples of the method, apparatuses, and non-transitory computer-readable medium described herein may further include operations, features, means, or instructions for determining the score associated with the setting representative based on a lead setting history of the setting representative, a number of leads set by the setting representative, a number of leads closed associated with the number of leads set by the setting representative, a ratio of the number of leads set to the number of leads closed associated with the setting representative, or a combination thereof.

In some examples of the method, apparatuses, and non-transitory computer-readable medium described herein, determining the score associated with the setting representative further may include operations, features, means, or instructions for determining the ratio of the number of leads set to the number of leads closed, and comparing the ratio of the number of leads set to the number of leads closed with an averaged ratio.

Some examples of the method, apparatuses, and non-transitory computer-readable medium described herein may further include operations, features, means, or instructions for determining the information of the person associated with the product or service based on an interaction between the person and the setting representative, where the interaction between the person and setting representative includes the setting representative identifying that the person may be interested in the product or service.

Some examples of the method, apparatuses, and non-transitory computer-readable medium described herein may further include operations, features, means, or instructions for transmitting, to a device associated with the person, a fourth message indicating information of the closing representative, a request to share information of the person with the one or more closing representatives, a confirmation of sharing information of the person with the one or more closing representatives, or a combination thereof.

Some examples of the method, apparatuses, and non-transitory computer-readable medium described herein may further include operations, features, means, or instructions for receiving, from the device associated with the person, a fifth message indicating a confirmation that the information of the person may be allowed to be shared with the closing representative, where transmitting the third message may be based on receiving the fifth message.

In some examples of the method, apparatuses, and non-transitory computer-readable medium described herein, the first message includes an approximate location of the person, an approximate location of the setting representative, or a combination thereof.

In some examples of the method, apparatuses, and non-transitory computer-readable medium described herein, the second message includes financial information associated with the closing representative, a location of the closing representative, a proximity of the closing representative to the person, an entity type of the closing representative, or a combination thereof.

Some examples of the method, apparatuses, and non-transitory computer-readable medium described herein may further include operations, features, means, or instructions for performing a search operation to identify the one or more closing representatives, where the search operation generates a list of the one or more closing representatives based on one or more filters, the one or more filters including a proximity threshold, an entity type, a threshold associated with the score of the setting representative, the score of the person, or a combination thereof.

Some examples of the method, apparatuses, and non-transitory computer-readable medium described herein may further include operations, features, means, or instructions for selecting the closing representative of the one or more closing representatives based on input received from the setting representative, where identifying that the closing representative may be selected may be based on the selecting.

A method is described. The method may include receiving, from a device associated with a setting representative, a first message indicating a person identified by the setting representative, the person associated with a product or service represented by a closing representative, the first message including a score associated with the person, a score associated with the setting representative, or a combination thereof, identifying financial information associated with the closing representative, transmitting, to the device associated with the setting representative, a second message indicating a request for information of the person based on receiving the first message, the second message including the financial information and a score associated with the closing representative, and receiving, from the device associated with the setting representative, a third message indicating that the closing representative is selected and including the information of the person.

An apparatus is described. The apparatus may include a processor, memory in electronic communication with the processor, and instructions stored in the memory. The instructions may be executable by the processor to cause the apparatus to receive, from a device associated with a setting representative, a first message indicating a person identified by the setting representative, the person associated with a product or service represented by a closing representative, the first message including a score associated with the person, a score associated with the setting representative, or a combination thereof, identify financial information associated with the closing representative, transmit, to the device associated with the setting representative, a second message indicating a request for information of the person based on receiving the first message, the second message including the financial information and a score associated with the closing representative, and receive, from the device associated with the setting representative, a third message indicating that the closing representative is selected and including the information of the person.

Another apparatus is described. The apparatus may include means for receiving, from a device associated with a setting representative, a first message indicating a person identified by the setting representative, the person associated with a product or service represented by a closing representative, the first message including a score associated with the person, a score associated with the setting representative, or a combination thereof, means for identifying financial information associated with the closing representative, means for transmitting, to the device associated with the setting representative, a second message indicating a request for information of the person based on receiving the first message, the second message including the financial information and a score associated with the closing representative, and means for receiving, from the device associated with the setting representative, a third message indicating that the closing representative is selected and including the information of the person.

A non-transitory computer-readable medium storing code is described. The code may include instructions executable by a processor to receive, from a device associated with a setting representative, a first message indicating a person identified by the setting representative, the person associated with a product or service represented by a closing representative, the first message including a score associated with the person, a score associated with the setting representative, or a combination thereof, identify financial information associated with the closing representative, transmit, to the device associated with the setting representative, a second message indicating a request for information of the person based on receiving the first message, the second message including the financial information and a score associated with the closing representative, and receive, from the device associated with the setting representative, a third message indicating that the closing representative is selected and including the information of the person.

Some examples of the method, apparatuses, and non-transitory computer-readable medium described herein may further include operations, features, means, or instructions for determining the score associated with the closing representative based on a lead-closed history of the closing representative, a number of leads received by the closing representative, a number of leads closed by the closing representative, a location of the closing representative, a proximity of the closing representative to the person, an entity type of the closing representative, or a combination thereof.

In some examples of the method, apparatuses, and non-transitory computer-readable medium described herein, identifying the financial information may include operations, features, means, or instructions for selecting a price to pay the setting representative to send the information of the person.

DETAILED DESCRIPTION

Figure 1:
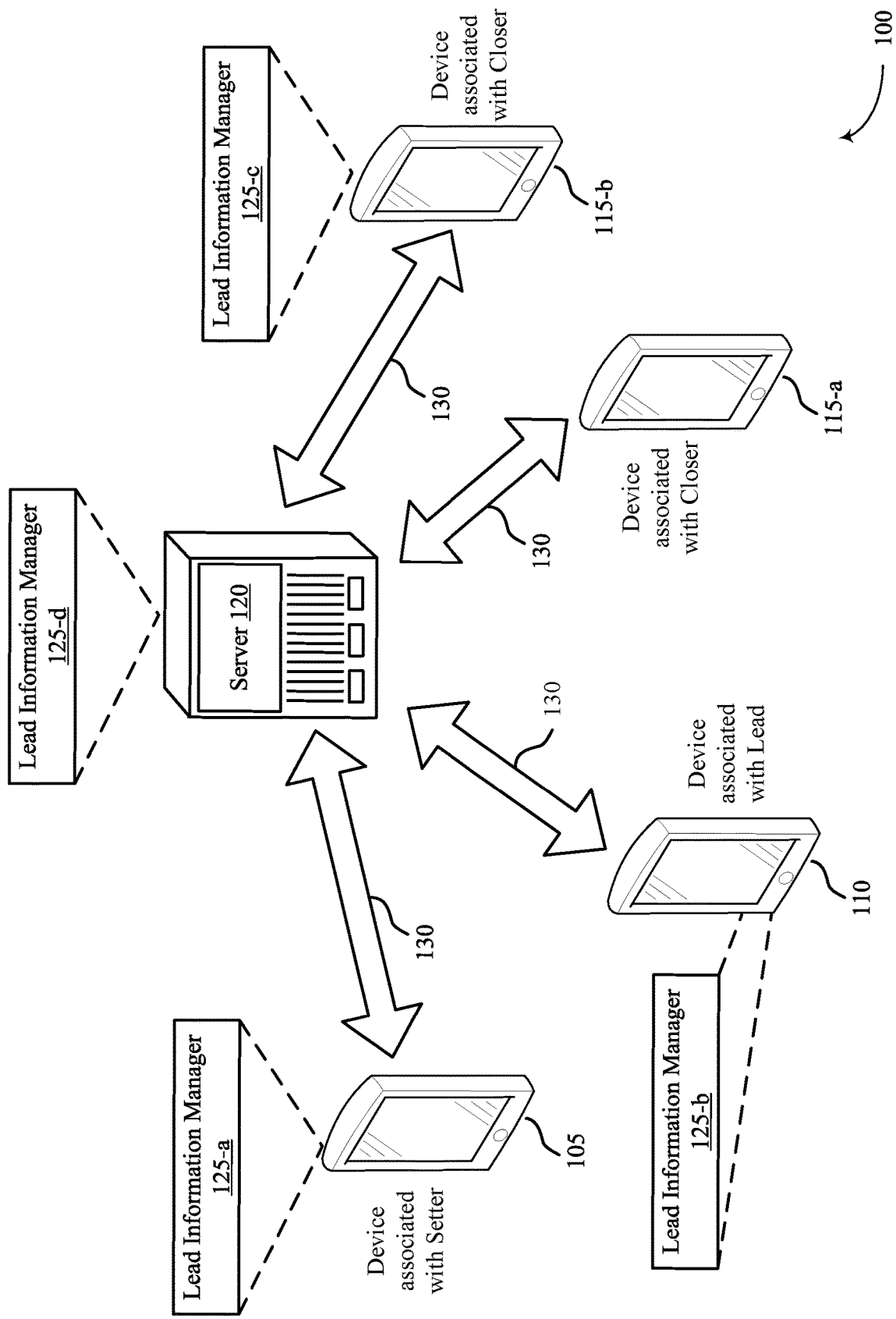
FIG. 1 illustrates an example of a system that supports techniques for lead information sharing in accordance with aspects of the present disclosure.

A provider may provide products or services to customers through one or more representatives and/or entities. While some customers may directly seek out the provider to purchase products or services, other potential customers may not. For example, the potential customers may be unaware of products or services that the provider offers or do not seek out the provider for some other reason. To reach these potential customers, the provider may send out its representatives to contact the potential customers to offer the products or services, either in person or via telephone, email, etc. However, if the provider does not know which individuals in an area are likely to be potential customers, the representatives may have to contact a large number of individuals in the area to identify potential customers, which may be inefficient.

To more efficiently identify potential customers, a representative of one or more providers may utilize a lead marketplace to obtain or share lead information as described herein. For example, a representative of one provider may obtain lead information from representatives of other providers, send lead information to the representatives of the other providers, or both. The other providers may be other entities that provide different products or services. In some cases, the representatives of the other providers may identify customers who are interested in the products or services offered by the provider (e.g., cross-selling). The representatives of various providers may be associated with each other and jointly use a sales platform (e.g., a lead marketplace) in order to offer products or services to the identified customers or to connect customers with other providers (e.g., connect customers via a new account with another provider based on an interaction with a representative).

A representative of one of the other providers may identify a lead based on an interaction with a person, who may be a customer, may be a potential customer, or may be a potential customer for a different product or service. For example, a representative of another provider may be on-site at a home of the person to provide a product or service (e.g., installation, maintenance, repair, or upgrade of a purchased product or service). While the representative is at the home, they may learn that the person is interested in a product or service offered by the provider, for example, because the person expresses interest or by some other means. The representative may inform the person of the products or services offered by the provider, and/or offer to have a representative of the provider contact the person and give the person the opportunity to learn more about or purchase the product or service offered by the provider. If the person agrees, the person may be referred to as a "lead," because the person is now a potential customer of the provider. By originating the lead, the representative becomes a lead setter or a lead originator, and may be referred to as a "setting" representative. The setting representative may identify or generate lead information associated with the lead. The setting representative may provide the lead information to other representatives using the sales platform. In other words, the setting representative "sets" the lead.

The setting representative may send an indication of the lead information to one or more other representatives (e.g., representatives associated with the provider or other providers). The other representatives may be referred to as "closing" representatives because they may "close" a deal with the person (e.g., the potential customer). That is, a closing representative may attempt to "close" the lead by contacting the person based on the lead information provided by the setting representative. A closing representative may close the lead by obtaining a sale, contract, subscription, etc., for the product or service. If the closing representative does not close the lead by obtaining a sale, contract, subscription, etc., that lead is considered not to be closed by the closing representative but may be counted as an attempted lead close. In some examples, the setting representative may send the indication based on a search operation (e.g., searching for closing representatives that satisfy one or more parameters), preferences of the setting representative (e.g., a "favorited" closing representative), among other examples.

The one or more closing representatives may receive the indication of the lead information. The indication may include information associated with the setting representative (e.g., a score of the setting representative), information associated with the lead (e.g., a score of the person), a requested price for the lead information, a market price for the lead information, among other examples. The information in the indication may be determined by a device of the setting representative, the one or more closing representatives, a server associated with the sales platform (e.g., the lead marketplace), or any combination thereof.

In some examples, a marketplace and/or a bidding process for leads may be established between setting representatives and closing representatives. In such a marketplace, a closing representative may review the indication and determine to request the lead information from the setting representative. The closing representative may provide a request for the lead information. The request may include a "bid" quantity (i.e., a price the closing representative is willing to pay to purchase the lead information from the setting representative). The request may also include a bid type, such as a "completion" bid type (e.g., indicating that payment may be sent to the setting representative upon completion of a sale). Additionally or alternatively, the bid type may be a "lead" bid type. (e.g., the closing representative pays the setting representative upon receipt of the lead from the setting representative). The request may also include other information, such as a score associated with the closing representative (e.g., based on a lead closing history of the closing representative, an entity type of the closing representative, a proximity of the closing representative to the lead), a location of the closing representative, and the like.

The setting representative may receive the request along with any other requests from other closing representatives, and select the closing representative. For example, the setting representative may select the closing representative that provides the highest bid for the lead. The setting representative may send the lead information to the closing representative and may receive payment from the closing representative. Additionally or alternatively, the setting representative may notify the person that the lead information has been sent. The closing representative may use the lead information to contact the person (e.g., after the person confirms or otherwise provides permission to be contacted) and attempt to close the lead.

Aspects of the disclosure are initially described in the context of an environment supporting lead information sharing. Additional aspects of the disclosure are described with respect to process flows. Aspects of the disclosure are further illustrated by and described with reference to apparatus diagrams, system diagrams, and flowcharts that relate to techniques for lead information sharing.

FIG. 1 illustrates an example of a system 100 that supports techniques for lead information sharing in accordance with various aspects of the present disclosure. The system 100 may include a setter device 105, a lead device 110, closer devices 115, and a server 120. The various devices and server 120 of the system 100 may communicate with each other over a communication system or network. In some examples, the communication system may be a wired communication system such as Ethernet, may be a wireless communication system such as a Long Term Evolution (LTE) network, an LTE-Advanced (LTE-A) network, an LTE-A Pro network, or a New Radio (NR) network, or a combination thereof. In some examples, the communication system may be the Internet, an intranet, a personal area network, a local area network (LAN), a wide area network (WAN), a virtual network, a telecommunications network implemented as a wired network and/or wireless network, and the like.

The setter device 105, the lead device 110, and the closer device 115 may be examples of user devices, such as smartphones, laptops, desktop computers, tablets, sensors, servers, or any other computing devices or systems capable of generating, analyzing, transmitting, or receiving communications. The setter device 105 may be operated by a setting representative associated with a provider (e.g., a business, an enterprise, a non-profit, a startup, or any other organization type that provides products, goods, or services). The lead device 110 may be operated by a person such as a customer or potential customer (e.g., a lead) of one or more providers. The closer device 115 may be operated by a closing representative associated with a provider (e.g., a different provider than the provider associated with the setting representative). The setter device 105, the lead device 110, and the closer device 115 may access the server 120 via communication links 130 to store, manage, and process data associated with the communications, opportunities, purchases, sales, etc.

The server 120 may be an example of a single server or a server cluster, or may be an example of one or more software modules implemented within other devices. The server 120 may be an example of a public or private network. For example, the server 120 may offer an on-demand database service to the device 105. In some cases, the server 120 may be an example of a multi-tenant database system. In this case, the server 120 may serve multiple devices 105 with a single instance of software. However, other types of systems may be implemented, including—but not limited to—client-server systems, mobile device systems, and mobile network systems. This may include support for sales, service, marketing, community, analytics, and applications.

In some cases, the provider may develop one or more applications to run on the server 120. The server 120 may be implemented using remote servers. In some cases, the remote servers may be located at one or more data centers. The multiple servers may be used for data storage, management, and processing. The server 120 may utilize multiple redundancies for security purposes. In some cases, the data stored at server 120 may be backed up by copies of the data at a different data center.

The various devices and servers in system 100 may include lead information managers 125. The lead information managers 125 may enable the various devices and servers to share lead information as described herein. For example, the closing representative may wish to identify potential customers (e.g., leads) to contact to sell products or services. The setting representative may identify a person (e.g., a potential customer), for instance, the person operating the lead device 110. The setting representative may use the setter device 105 to interact with a sales platform such as a lead marketplace. The setter device 105 may include a lead information manager 125-a. The lead information manager 125-a may indicate the lead and/or send the lead information, using the sales platform, to a closer device 115. The lead information manager 125-a may also generate and/or send other information such as a score associated with the lead, a score associated with the setting representative, a market price of the lead, a requested price of the lead, etc. A closing representative may utilize the closer device 115 to interact with the sales platform, e.g., to request and/or obtain the lead information. For example, a closer device 115-a may include a lead information manager 125-c, which may receive lead information, send lead information requests, determine a score associated with the closing representative, identify financial information (e.g., a "bid" quantity and a bid type), among other examples. In some examples, the setter device 105 (e.g., the lead information manager 125-a) may also transmit a notification to the lead device 110 (e.g., the lead information manager 125-b). In such examples, the setter device 105 may refrain from transmitting the lead information until the lead device 110 provides a confirmation message.

The server 120 may also include a lead information manager 125-d. The lead information manager 125-d may perform some or all of the functions described with reference to lead information managers 125-a, 125-b, and 125-c. For example, the lead information manager 125-d may determine scores associated with closing representatives operating closer devices 115. The lead information manager 125-d may determine a score based on information stored at the server 120 or received from a closer device 115 via communication links 130. For example, the lead information manager 125-d may determine a score for the user of closer device 115-b using a location of the closer device 115-b, a lead-closed history of the user of the closer device 115-b, a proximity of the closer device 115-b to the lead device 110, an entity type of the user of the closer device 115-b, or any combination thereof. Additionally or alternatively, the lead information manager 125-d may transmit the scores to the setter device 105 via communication links 130.

In some examples, the functions described herein may be performed by a single device or multiple devices (e.g., various functions described herein may be performed at one or more of the devices described herein). For example, the functions described herein may be performed by a single lead information manager 125 or multiple lead information managers 125.

One or more aspects of the disclosure may be implemented in the system 100 to additionally or alternatively solve other problems than those described above. Furthermore, aspects of the disclosure may provide technical improvements to existing systems or processes as described herein. The description and appended drawings may include examples of technical improvements resulting from implementing aspects of the disclosure, and accordingly do not represent all of the technical improvements provided within the scope of the claims.

Figure 2:
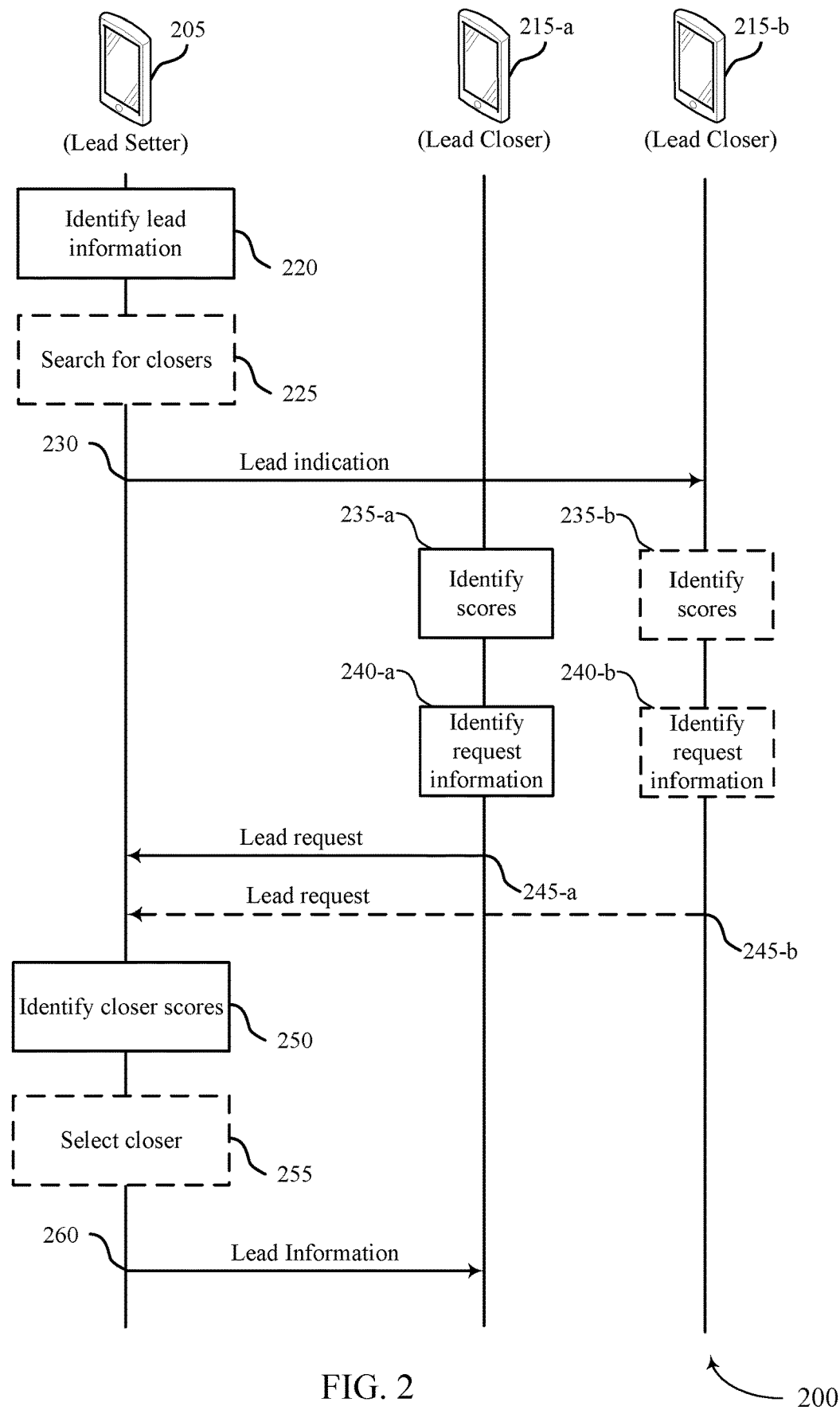
FIG. 2 illustrates an example of a process flow that supports techniques for lead information sharing in accordance with aspects of the present disclosure.

FIG. 2 illustrates an example of a process flow 200 that supports techniques for lead information sharing in accordance with aspects of the present disclosure. The process flow 200 may include a setter device 205 and two closer devices 215 (e.g., closer device 215-a and closer device 215-b). The setter device 205 and the closer devices 215 may be examples of the devices 105 as described with reference to FIG. 1. Alternative examples of the following may be implemented, where some steps are performed in a different order than described, not performed at all, steps may include additional features not described below, or further steps may be added. In some cases, the process flow 200 may include more or fewer devices as those illustrated. For example, operations of the process flow 200 may be performed by a server 120.

In some examples, a provider may offer products or services to customers through one or more representatives and/or entities. A provider may wish to identify leads (e.g., potential customers) who may be interested in the products or services, who may be unaware of the products or services, or who may otherwise be relatively likely to purchase the products or services after being contacted by representatives of the provider (e.g., closing representatives associated with the closer devices 215). Such identification may enable the provider to more efficiently utilize resources and representatives to increase sales revenue for the products and services.

A marketplace for leads may be established between representatives (e.g., setting representatives and closing representatives) and/or providers. For example, a marketplace may be established between the various devices described herein, such as between the setter device 205 and the closer devices 215-*a* and 215-*b*. A representative (e.g., a representative associated with a provider) may utilize the marketplace to obtain or share lead information as described herein. For example, a representative of a provider may obtain lead information from representatives of other providers, send lead information to the representatives of the other providers, or both. The other providers may be other entities that provide different products or services. In some cases, the representatives of the other providers may identify customers who are interested in the products or services offered by the provider (e.g., cross-selling). The representatives of the various providers may be associated with each other and jointly use a sales platform (e.g., the lead marketplace) in order to offer products or services to the identified customers or to connect customers with other providers.

The marketplace may enable representatives to share lead information utilizing a bidding process. For example, a setting representative of a provider may identify a lead (e.g., interested in a product or service offered by another provider). The setting representative may initiate a bidding process for the lead. For example, the setting representative may offer to exchange information of the lead for payment from one or more closing representatives (e.g., associated with the product and service that the person is interested in). The information of the lead, for example, may include contact information of the lead enabling a selected closing representative to attempt to "close" the lead as described herein. As an example, the setting representative may receive "bids" from one or more closing representatives, which may request the lead information (e.g., the contact information of the lead) from the setting representative. In some examples, the setting representative may select a closing representative based on the received bids, and transmit the lead information to the closing representative. Thus, a marketplace may be implemented that may enable representatives to more efficiently identify leads and increase sales revenue for products and services (e.g., offered by the provider associated with the closing representative).

For example, the setting representative may be associated with one or more providers (e.g., the setting representative may connect customers to multiple services offered by other providers represented by closing representatives). The setting representative may set the lead, and the marketplace may connect one or more closing representative with the setting representative. The closing representatives may bid (e.g., based on the various scoring described herein) for information of the lead and the setting representative may select a closing representative to receive the information (e.g., based on various scorings, a favorited closing representative, among other examples of factors for selecting a closing representative). Such a marketplace may enable providers to establish new accounts (e.g., accounts with the lead) through the closing representatives.

A setting representative may operate the setter device 205. A setting representative may be a representative or employee of an entity that provides products or services. The entity may be partnered with one or more other entities that provide other products or services. The entities may have a business agreement or be associated with each other in a partnership or other type of business arrangement. The entities may jointly use a sales platform (e.g., a lead marketplace) in order to connect customers to the other entities or to offer products or services to customers of other companies using the sales platform. In some examples, the different entities may serve part, or all, of the same customer base. As used herein, the term partnership is meant to indicate an association between two or more entities, and may not necessarily indicate a legal partnership between the two or more entities. Furthermore, as used herein, the terms entity, company, and provider may be used interchangeably.

The setting representative may identify a lead based on an interaction with a person. For example, the setting representative may work for a company that provides home automation and security solutions. The company may be partnered with other companies, such as a utility company or a network service provider. The setting representative may be on-site at a home of a person (e.g., a customer of the setting representative) for installation, maintenance, repair, or upgrade of a home security and automation system for the person. While the setting representative is at the home, the person may express interest in a product or service offered by a partner of the home security and automation company. For example, the person may express that they would like to have a satellite network system installed by the network service provider. The person may have already known about the satellite network system or the setting representative may have informed the person about it. The person then becomes a lead for the network service provider, because the person of the home automation and security company is now a potential customer for the network service provider. The setting representative is a lead setter because they identify the potential lead to the partnering entity (e.g., the network service provider). In other words, the setting representative sets the lead.

At 220, the setter device 205 may identify lead information (e.g., information about the person). That is, the setter device 205 may generate, receive (e.g., from a server 120, from a lead device 110, or from input of the setting representative), or otherwise identify the lead information. The lead information may be information the setting representative already had about the lead or obtains about the lead, from the lead in person or electronically. In some other examples, the lead may use their own device to send lead information (e.g., to the setter device 205 or to a server 120). For example, the setting representative may provide the lead with a website that contains a form to fill out information regarding themselves and the products or services they are interested in. The lead may access the website with a lead device 110, enter lead information, and the website may provide the entered information to the setter device 205 or a server 120.

The lead information may include contact information of the lead. For example, the lead information may include a name of the lead, a location or address of the lead, a phone number of the lead, among other examples. The lead information may also include location information. For example, the location information may include a location of the lead (e.g., a provided or known address of the lead or a location of a lead device 110 associated with the lead), a location of the setter device 205, a proximity of the lead to one or more closer devices 215, among other examples. The location information may be determined based on information from a global navigation satellite system (GNSS), such as the Global Positioning System (GPS). In other examples, the location information may be determined in other ways, such as triangulation from cell towers or provided via user input.

In some examples, the lead information may also include other information about the lead, or about family or housemates of the lead, such as information related to demographic characteristics, financial characteristics, a purchase history, a preference or interest level associated with products or services, consumer interests, personally identifying information, financial information, a use history of the product or service, a use history of related products or services, other contact information, a credit history, a qualification, and the like.

At 225, the setter device 205 may search for closers (i.e., closing representatives). For example, the setter device 205, or a server 120, may perform a search operation to identify closer devices 215 associated with closing representatives. The search operation may generate a list of closing representatives for potential transmission of the lead information (e.g., closer device 215-a and closer device 215-b). The search operation may generate the list based on one or more filters. That is, the setter device 205 may select a list of closer devices 215 (e.g., closer device 215-a and closer device 215-b) based on the list of closer devices 215 satisfying the one or more filters. In some examples, the one or more filters may include a proximity threshold. For example, the setter device 205 may determine whether a closer device 215-b is located less than five miles from the lead location and may include the closer device 215-b in the list. The one or more filters may also include an entity type. For example, the setter device 205 may determine whether a closer device 215-b is an individual capable of visiting the lead in person or a call center and include or exclude the closer device 215-b from the list based on a preference of the setting representative. The one or more filters may also include a threshold associated with a score of the closing representatives. For example, the closer devices 215-a and 215-b may satisfy a configured closer score threshold and may be included in the list of closer devices 215.

In some examples, a closing representative may be "favorited" by the setting representative. For example, the setting representative may have previously worked with a closer and designate the closer as a "favorite" in the settings or preferences of the setter device 205. The setter device 205 may alter (e.g., increase) a closer score of the favorited closer, include the favorited closer in the list of closer devices 215 (e.g., when the closer device 215 of the favorited closer fails to satisfy a threshold or a filter of the search operation), or both.

At 230, the setter device 205 may transmit a lead indication. In some examples, the setter device 205 may transmit the lead indication to one or more closer devices 215. For example, the setter device 205 may transmit the lead indication to closer devices 215 associated with the marketplace (e.g., the sales platform), closer devices 215 within a geographic area (e.g., a five mile radius of the setter device 205), the identified list of closer devices 215 (e.g., closer device 215-a and closer device 215-b), one or more "favorited" closer devices 215, a pre-configured list of closer devices 215, a selected list of closer devices 215 (e.g., selected by the setting representative via the setter device 205), among other examples. Additionally or alternatively, the setter device 205 may transmit the lead indication to other entities, such as the server 120, a call center, and the like.

The lead indication may be a message informing closing representatives that the setting representative has a lead (e.g., a person such as a potential customer for the closing representatives to contact). The lead indication may include a portion of the lead information or information based on the lead information and/or the setting representative. For example, the lead indication may include a score associated with the lead (i.e., a lead score), a score associated with the setting representative (i.e., a setter score), an approximate location of the lead and/or the setting representative (e.g., a circle with a mile radius on a map that includes the lead location), a product or service that the lead is interested in, among other examples.

At 235-a, the closer device 215-a may identify scores based on the lead indication. For example, the closer device 215-a may determine a lead score, a setter score, or a score associated with the closing representative operating the closer device 215-a (e.g., a closer score) based on the lead indication. In some examples, the closer device 215-a may generate one or more of the scores (e.g., the lead score, the setter score, and the closer score) based on information included in the lead indication or otherwise determined by the closer device 215-a. In some other examples, the closer device 215-a may receive the one or more scores from another device.

For example, a device (e.g., the setter device 205, a lead device 110, a server 120, a closer device 215, or a combination thereof) may determine a lead score, a setter score, one or more closer scores (e.g., a closer score associated with each closer device 215), or a combination thereof based on a number of factors. Each factor may have an associated scoring dimension, and the scores may be based on the associated scoring dimensions. The device may use any or all of the scoring dimensions to determine the scores. The scoring dimensions may include a lead setter scoring dimension, a lead subject scoring dimension, a lead intent scoring dimension, a physical location scoring dimension, a lead closer scoring dimension, as well as additional scoring dimensions.

The lead setter scoring dimension may be based on information associated with the setting representative operating the setter device 205. In some examples, the lead setter scoring dimension may be based on the proximity of the setting representative to the lead. The lead setter scoring dimension may be further based on a history of the setting representative. The history of the setting representative may include a number of leads previously set by the setting representative. The history of the setting representative may also include a number of leads set by the setting representative that were successfully closed by a closing representative. The history of the setting representative may also include a ratio of the number of leads set to the number of leads closed, which may be determined by comparing the number of leads set by the setting representative to the number of leads set by the setting representative that were successfully closed.

The device may have access to information related to the setting representative and to other setting representatives. For example, the device may have information related to the number of leads set by each setting representative and whether those leads were successfully closed by a closing representative. The device may compare the ratio of the number of leads set to the number of leads closed for the setting representative to an average leads set to leads closed ratio for some or all of the other setting representatives. The device may adjust a score of the lead setter scoring dimension based on this comparison. For example, the device may increase the score of the lead setter scoring dimension if the ratio of the number of leads set to the number of leads closed for the setting representative is greater than the average ratio. Alternatively, the device may decrease the score of the lead setter scoring dimension if the ratio of the number of leads set to the number of leads closed for the setting representative is less than the average ratio. By adjusting the score of the lead setter scoring dimension based comparing the ratio of the number of leads set to the number of leads closed for the setting representative to the average ratio, the lead setter scoring dimension may more accurately identify scoring representatives who are particularly effective at setting leads that have a higher likelihood of being successfully closed.

The device may continue to assess the lead setter scoring dimension based on new leads set by the setting representative over time and whether the leads set by the setting representative are successfully closed. The device may update the history of the setting representative as the setting representative sets new leads and as leads set by the setting representative are successfully closed. If the history of the setting representative includes a number of recent leads successfully set and closed, the device may increase the score of the lead setter scoring dimension based on the recent successfully set and closed leads. The recent successfully set and closed leads may accelerate an increase of the score of the lead setter scoring dimension, which may allow the setting representative to more quickly see improvement in the lead setter scoring dimension associated with the setting representative.

The device may increase the score of the lead setter scoring dimension based on a success weighting factor, where the recent successfully set and closed leads may be given a greater weight than other factors in the history of the setting representative. The device may use the success weighting factor to be more responsive to recent successes of the setting representative, as opposed to determining the score of the lead setter scoring dimension solely based on an overall ratio of the number of leads set to the number of leads closed for the setting representative. For example, if the setting representative recently received relevant training and as a result their lead sets have been more successful than they were before the training, the lead information manager may take this into account. By giving a greater weight to recent successfully set and closed leads, the setting representative may be able to more effectively leverage recent successes and more quickly see an increase in the score of the lead setter scoring dimension associated with the setting representative.

The device may determine the lead subject scoring dimension based on a likelihood the lead will actually purchase the service. The device may determine the likelihood based on the information associated with the lead. In some examples, the device may aggregate the lead information to determine the likelihood. Additionally or alternatively, the device may determine the likelihood based on historical data or past interactions with the lead. Some of the factors indicate a greater or lesser likelihood that the lead will actually proceed with the purchase. Additionally, a previous history of using the product or service may be a strong indicator that the lead would use the product or service again. Similarly, a larger income may indicate a higher likelihood of purchasing the product or service than a smaller income. The device may analyze and weight these factors appropriately to generate the lead subject score.

The device may determine the lead intent scoring dimension based on an intent to purchase the product or service, where the intent to purchase may be associated with the lead. The device may determine the intent to purchase based on the types of information provided by the lead. That is, the more information the lead provided about themselves, the more likely that the lead is seriously interested in the product or service. For example, if a lead provides contact information (e.g., a telephone number, an email address, etc.) without additional information, the device may consider the lead to not be very interested in the product or service. However, if a lead provides additional information to the setting representative, such as personally identifiable information, the device may determine the intent to purchase is high. In some examples, the device may aggregate information associated with the lead to determine the intent to purchase. Additionally or alternatively, the device may determine the intent to purchase based on historical data or past interactions with the lead.

The device may determine the physical location scoring dimension based on the location of the lead, the locations of the closing representatives, the location of the setting representative, or a combination thereof. The device may adjust a score of the physical location scoring dimension based on the proximity of the setting representative to the lead and the proximities of the closing representatives to the lead. In some examples, if the device determines the setting representative set the lead in person, the device may increase the score of the physical location scoring dimension on the basis that leads set in person typically have higher closing rates. In some examples, if the device determines that a closing representative is near the lead based on the proximity of the closing representative to the lead, the device may increase the score of the physical location scoring dimension on the basis that leads quickly approached by closing representatives are more likely to close.

In some examples, the device may compare the proximity of each closing representative to a proximity threshold (e.g., one mile, five miles, etc.) to determine if more than one closing representative is within the proximity threshold. The device may determine a proximity score for each closing representative within the proximity threshold based on the proximity of each closing representative to the lead. The device may compare the proximity scores to determine a highest proximity score. Based on comparing the proximity scores, the device may identify which closing representative is closest to the lead. The device may determine a higher lead score and/or a higher closer score the nearer the closing representative is to the lead.

The device may determine the lead closer scoring dimension based on a history of leads closed for each closing representative. A closing representative may close the lead by obtaining a sale, contract, subscription, etc., for the service. If the closing representative does not close the lead by obtaining a sale, contract, subscription, etc., that lead is considered not to be closed by the closing representative but may be counted as an attempted lead close. The device may have access to a history of each closing representative, wherein the history identifies the number of lead closing attempts and the number of successful lead closes for the closing representatives. The more successful a closing representative is, the higher the associated lead closer scoring dimension for that closing representative may be.

In some examples, the device may adjust each scoring dimension based on one or more weighting factors associated with each scoring dimension. For example, a provider may wish to assign a higher value to the physical location scoring dimension and a lower value to additional scoring dimensions, in an effort to encourage nearby closing representatives to follow up on leads quickly, and so may adjust the weighting factors accordingly. The device may determine the scores based on a sum of the adjusted scoring dimensions, a weighted sum, a ratio of the sum to the weighted sum, etc.

The scores may be indicative of a probability of products or services being purchased. For example, the lead score may be indicative of a probability that the lead will actually purchase the service. For example, the lead may be assigned a higher score if there is a higher probability the lead will purchase the service, while the lead may be assigned a lower score if the probability is lower. In some examples, the lead score may include a number, such as a number between zero and one hundred. In some examples, the lead score may be a percent. In other examples, the lead score may be associated with a different scale, such as a color scale (e.g., green indicating a higher score than red), or the like. Additionally or alternatively, the setter score may be indicative of a probability that the lead has a relatively likely chance of purchasing a product or service, and the closer score may be indicative of a probability that the closing representative will successfully "close" the deal.

At 235-b, the closer device 215-b may also identify scores based on the lead indication. For example, the closer device 215-b may also receive the lead indication (e.g., due to being included in the search operation at 225) and the closer device 215-b may identify scores for the closing representative associated with the closer device 215-b to review, such as the setter score and the lead score.

At 240-a, the closer device 215-a may identify request information. For example, the closing representative associated with the closer device 215-a may review the information included in the lead indication, such as a lead score, a market price of the lead, a location of the lead, a proximity of the lead to the closing representative, or any other lead information described herein. The closing representative may determine to request the lead information from the setting representative. In other words, the closing representative may make a "bid" for the lead information. The request may be included or indicated in a message to the setter device 205 as shown at 245-a. In some examples, the closer device 215-a may identify the request information based on input received from the closing representative. In some other examples, the closer device 215-a may determine the request information without such input. For example, the request information may be pre-configured by the closing representative (e.g., the closer device 215-a may automatically make a request for the lead information based on preferences or settings of the closing representative).

The request information may include financial information. For example, the financial information may include a bid amount configured or input by the closing representative. The bid amount may be a price that the closing representative is offering to pay the setting representative in exchange for the lead information. The financial information may also include a bid type. In some examples, the bid type may be a "completion" bid type. In such examples, the closing representative may send payment to the setting representative upon completion of a sale (e.g., after the closing representative successfully closes the lead). In some examples, the bid type may be a "lead" bid type. In such examples, the closing representative may send payment to the setting representative for the lead information (e.g., regardless of whether the sale is completed or not). In such examples, the closer pays the setter upon receipt of the lead from the setter. In some examples, the bid type may be a combination of a "completion" bid type and a "lead" bid type.

In some examples, the request information may also include a closer score of the closing representative or information that may be used to determine the closer score of the closing representative as described herein with reference to 235-a. The request information may also include other information such as a location of the closing representative, a proximity of the closing representative to the lead, an entity type of the closing representative (e.g., a call center, an individual, a provider, or a group of individuals which can sometimes be referred to as a dealership), or any combination thereof.

At 240-b, the closer device 215-b may also identify request information. For example, the closing representative associated with the closer device 215-b may also determine to make a "bid" for the lead information. In such examples, the closer device 215-b may identify request information corresponding to the closing representative associated with the closer device 215-b, such as a bid amount, a bid type, a closer score, a location and/or a proximity to the lead, among other examples.

At 245-a, the closer device 215-a may transmit a lead request. The lead request may indicate a request for information of the person (e.g., lead information of the lead such as contact information). The lead request may also include some or all of the request information identified at 240-a. At 245-b, the closer device 215-b may also transmit a lead request. The lead request transmitted at 245-b may include some or all of the request information identified at 240-b.

In some examples, the closer devices 215-a and the closer devices 215-b may have a time window to transmit the lead request. For example, an opportunity to make a bid (i.e., transmit a message including the lead request) may expire after a certain duration of time. The time window may be configured by the setting representative or determined by one or more devices (e.g., a server 120). In some other examples, the closer devices 215 may transmit the lead request outside of the time window (e.g., if the closing representative is designated as a "favorite" or if the setting representative does not configure a time window).

At 250, the setter device 205 may identify one or more closer scores. For example, the setter device 205 may receive a lead request from the closer device 215-a and identify a closer score associated with the closing representative operating the closer device 215-a. In some examples, the setter device 205 may receive multiple lead requests from closer devices 215 (e.g., from the closer device 215-a and the closer device 215-b) and identify a closer score for each closer device 215.

In some examples, the setter device 205 may receive the closer scores. For example, the setter device 205 may receive the closer scores from a server 120 or from the closer devices 215 (e.g., included in the lead request of each closer device 215). In some other examples, the setter device 205 may determine or generate the closer scores. For example, the setter device 205 may have or receive information used to determine the closer scores, such as a lead closed history of the closing representatives, a "favorited" status of one or more of the closing representatives, location information of the closer devices 215, preferences of the setter device 205, among other examples described herein.

At 255, the setter device 205 may select a closer (i.e., a closing representative). In some examples, the setter device 205 may receive input from the setting representative and select a closer for transmission of the lead information based on the input. For example, the setting representative may review the request information included in the lead requests (e.g., financial information such as bid amounts, an entity type of the closing representatives, closer scores for each closing representative, and the like) and select a closer based on the review. Additionally or alternatively, the setter device 205 may determine a closer based on one or more settings or preferences of the setting representative. For example, the setter device 205 may be configured to select the closer with the highest bid amount (e.g., the setter device 205 may receive one or more "bids" and automatically select the closer device 215 associated with the highest bid quantity), a favorited closer (e.g., a closing representative that the setting representative has configured the setter device 205 to automatically select), a closer with the nearest proximity to the lead, etc.

At 260, the setter device 205 may transmit the lead information. In some examples, the setter device 205 may transmit some or all of the lead information to a selected closer (e.g., the closing representative associated with closer device 215-*a*). For example, the setting representative may select a closer at 255 and transmit the contact information of the lead to the closer. The closer may use the contact information to attempt to close the lead (i.e., offer a product or service to the person).

In some examples, the setter device 205 may transmit a confirmation message or a notification message to a lead device 110 associated with the lead. For example, the setter device 205 may transmit a notification message to the lead device 110 informing the lead that the lead information (e.g., the contact information) has been sent to a closing representative. Additionally or alternatively, the setter device 205 may transmit a confirmation message to the lead device 110 requesting a confirmation from the lead. The setter device 205 may transmit the lead information and/or the notification message upon receiving a confirmation (e.g., a message or indication of consent to share lead information) from the lead.

In some examples, a closing representative associated with a closer device 215 (e.g., the closer device 215 associated with a selected closer to receive the lead information) may transmit a payment to the setting representative associated with the setter device 205. For example, the closer device 215 may transmit payment upon completion of a sale (e.g., a successful "close" of the lead). In such examples, the closer device 215 may have transmitted a request including a "completion" bid type. Additionally or alternatively, the closer device 215 may transmit payment upon reception of the lead information. For example, the closer device 215 may receive the lead information (e.g., due to being selected by the setter device 205) and the closer device 215 may send payment to the setter device 205 (e.g., in response to receiving the lead information, prior to receiving the lead information, or included in the request for the lead information). In such examples, the closer device 215 may have transmitted a request including a "lead" bid type. In some cases, the closer device 215 may transmit payment to the closer device 215 upon reception of the lead information and additionally upon completion of a sale.

The process flow 200 illustrated in FIG. 2 and described herein is one example of how lead information may be shared. The steps of process flow 200 may be performed by other devices than those illustrated performing the steps in FIG. 2. In some examples, some or all of the steps may be performed at the setter device 205, one or more of the closer devices 215, a server 120, a lead device 110, or any combination thereof.

Figure 3:
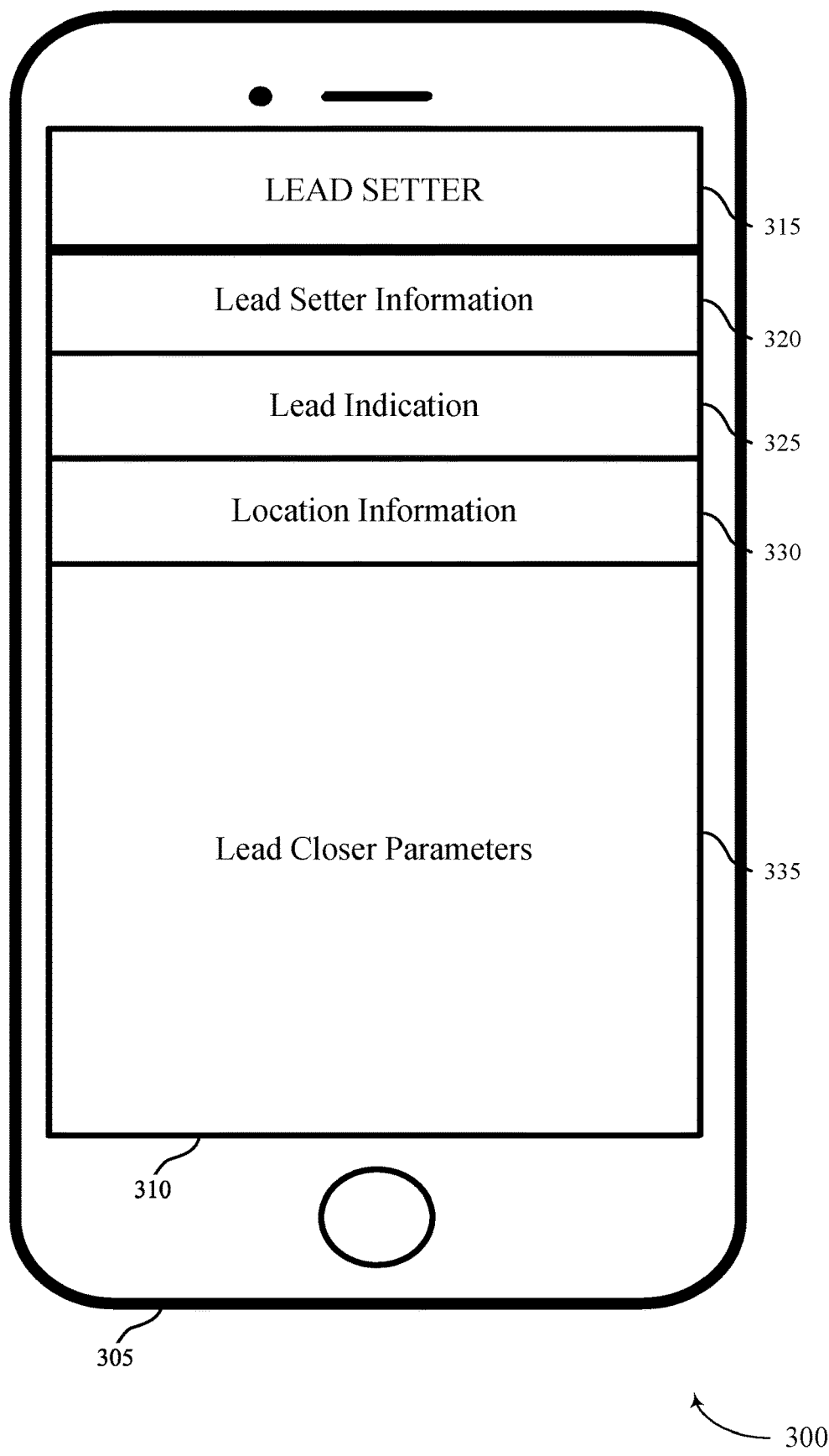
FIG. 3 illustrates an example user interface that supports techniques for lead information sharing in accordance with aspects of the present disclosure.

FIG. 3 illustrates an example of a user interface 300 that supports techniques for lead information sharing in accordance with aspects of the present disclosure. In some examples, the user interface 300 may implement aspects of the system 100. For examples, the user interface 300 may be for an application on a computing device and may enable a setting representative to interact with a lead information manager. For example, a setter device 105, a lead device 110, or a closer device 115 may output the user interface 300 as part of a graphical user interface (GUI) for the sales platform application.

The user interface 300 may be displayed on a computing device 305, which may be an example of a setter device 205 as described with reference to FIG. 2. The user interface 300 may be displayed on a display 310 of the computing device 305. The user interface 300 may also include several fields of information.

The user interface 300 may include a name field 315. The name field 315 may be configured to display a name of the setting representative. The user interface 300 may also include a lead setter information field 320. The lead setter information field 320 may be configured to display information associated with the setting representative operating the computing device 305, such as a setter score. The setter score may be based on a history of the setting representative and may also be based on a comparison of the setting representative with other setting representatives, and may be adjusted according to one or more weighting factors as described herein. In some other examples, the lead setter information field 320 may indicate one or more of a history of the setting representative, a current successful lead sets streak, a number of leads set, or the like.

The user interface 300 may also include a lead indication field 325. The setting representative may select the lead indication field 325 to input or view information associated with a lead (e.g., lead information). The setting representative may cause the computing device 505 to provide the lead information to the lead information manager. The lead information may include information about the lead, or family or housemates of the lead, related to a demographic characteristic, a financial characteristic, a purchase history, a preference associated with the product or service, a consumer interest, personally identifying information, financial information, a use history of the product or service, a use history of related products or services, contact information, a credit history, a qualification, among other examples as described with reference to FIG. 2.

The user interface 300 may also include a location information field 330. The setting representative may select the location information field 330 to input or view location information. The location information may include a location of the computing device 505 and/or the lead (e.g., a lead device 110 or an address of the lead). In some examples, the user interface 300 may display a map indicating the locations of one or more closers (e.g., closer devices). For example, markers may be placed on the display of the map to indicate the location or a general location (e.g., an approximated location) of one or more closers.

The user interface 300 may also include a lead closer parameters field 335. The setting representative may select the lead closer parameters field 335 to view of input one or more parameters, settings, preferences, or filters. For example, the computing device 305 may perform a search operation to identify one or more closing representatives for transmission of the lead indication based on the lead closer parameters field 335.

Figure 4:
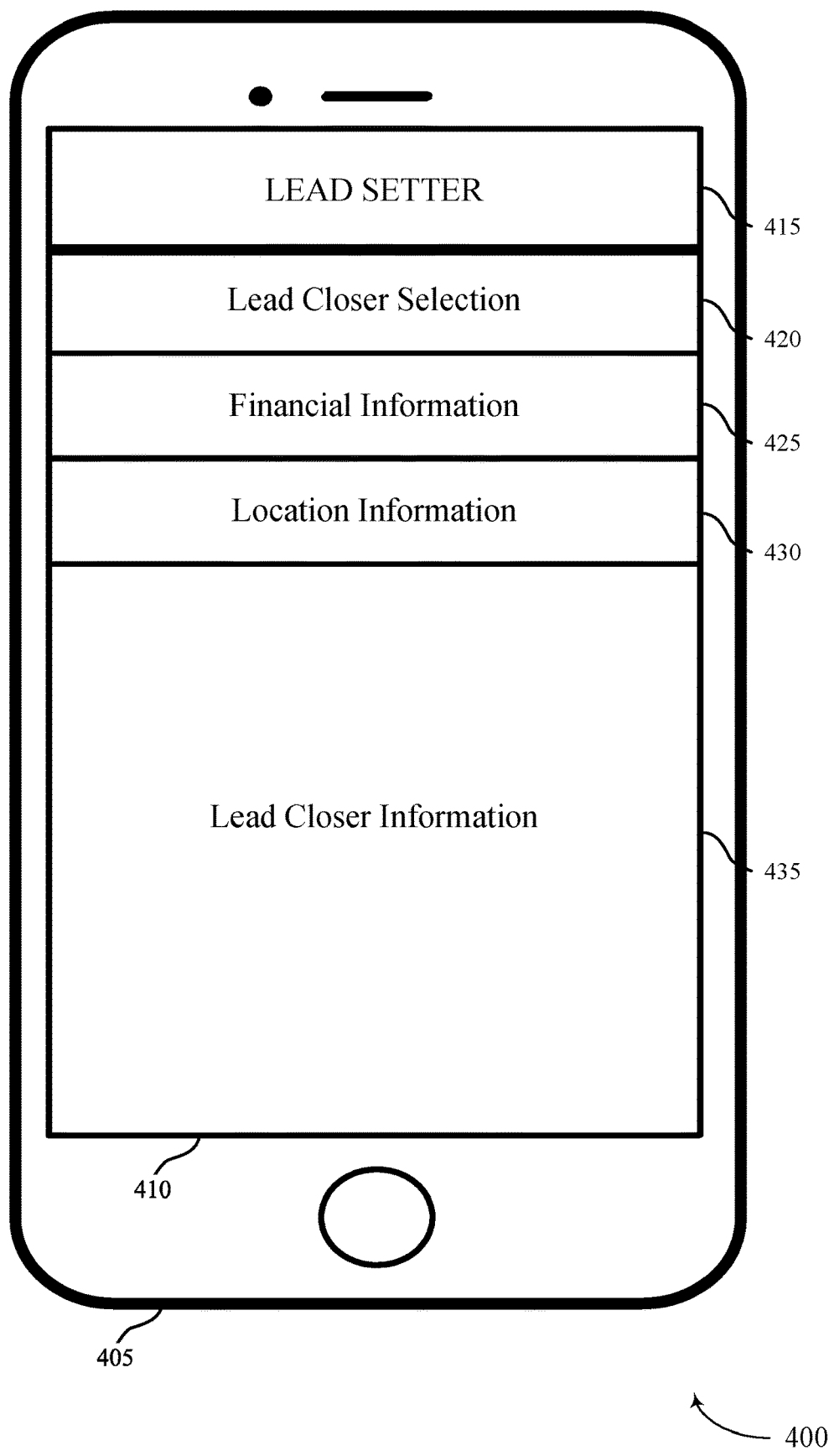
FIG. 4 illustrates an example of a user interface that supports techniques for lead information sharing in accordance with aspects of the present disclosure.

FIG. 4 illustrates an example of a user interface 400 that supports techniques for lead information sharing in accordance with aspects of the present disclosure. In some examples, the user interface 400 may implement aspects of the system 100. For example, the user interface 400 may be an application on a computing device (e.g., a setter device 105) and may enable a setting representative to interact with a lead information manager.

The user interface 400 may be displayed at least one computing device 405, which may be an example of a device 105 as described with reference to FIG. 1. The user interface 400 may be displayed on a display 410 of the computing device 405. The user interface 400 may also include a name field 415. The name field 415 may be configured display a name of the setting representative.

The user interface 400 may also include a lead closer selection field 420. The lead closer selection field 420 may be configured to display a name of a closing representative that may be selected for transmission of lead information. For example, the setting representative may select one of a plurality of lead requests, for example, to review the closing representative information associated with the lead request.

The user interface 400 may also include a financial information field 425. The financial information field 425 may include a bid amount, a bid type, or other such information as described herein. Additionally or alternatively, the user interface 400 may include a location information field 430. The setting representative may select the location information field 430 to input or view location information (e.g., a location or proximity of the closing representative).

The user interface 400 may also include a lead closer information field 435. The setting representative may select the lead closer information field 435 may to input or display information associated with the closing representative, such as closer score of the closing representative, or other information (e.g., included in identified request information as described with reference to FIG. 2).

In some examples, the setting representative may determine to select the closing representative by inputting a selection or confirmation in the user interface 400. In such examples, lead information associated with a person such as a customer or a potential customer may be transmitted to the closing representative as described herein.

Figure 5:
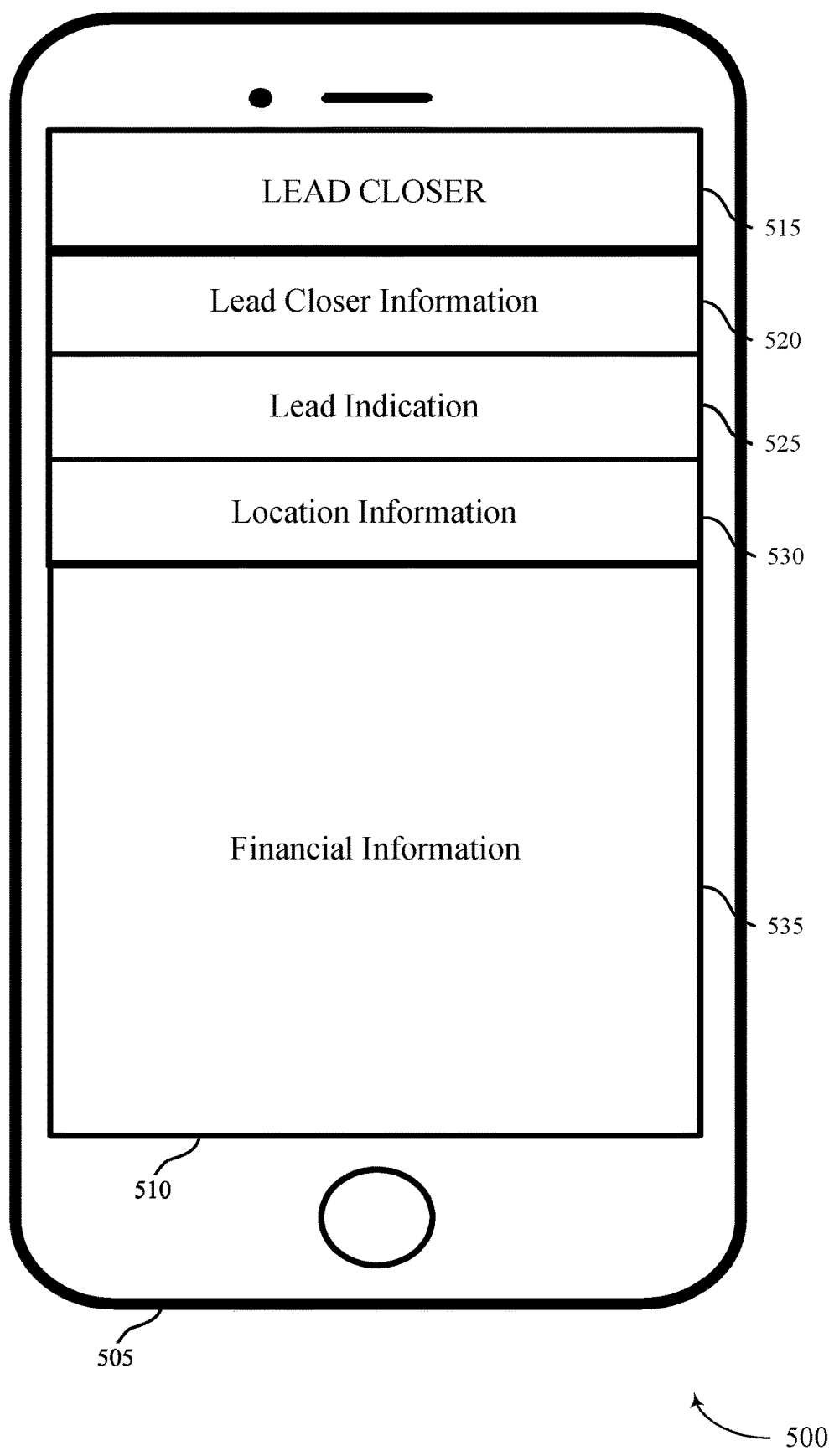
FIG. 5 illustrates an example of a user interface that supports techniques for lead information sharing in accordance with aspects of the present disclosure.

FIG. 5 illustrates an example of a user interface 500 that supports techniques for lead information sharing in accordance with aspects of the present disclosure. In some examples, the user interface 500 may implement aspects of the system 100. For example, the user interface 500 may be an application on a computing device (e.g., a closer device 115) and may enable a closing representative to interact with a lead information manager.

The user interface 500 may be displayed at least one computing device 505, which may be an example of a closer device 115 as described with reference to FIG. 1. The user interface 500 may be displayed on a display 510 of the computing device 505. The user interface 500 may also include a name field 515. The name field 515 may be configured to display a name of the closing representative.

The user interface 500 may also include a lead closer information field 520. The lead closer information field 520 may be configured to display information associated with the closing representative, such as a history of leads closed for the closing representative, a closer score of the closing representative, and the like. For example, the lead closer information field 520 may show a success rate for the closing representative. The success rate may be based on a total success rate, a success rate based on at least one demographic or other characteristic of the lead, a location of the lead, or the like.

The user interface 500 may also include a lead indication field 525. The lead indication field 525 may be configured to display information included in a lead indication from a setting representative. For example, the lead indication field 525 may display lead information such as a lead score, a setter score, an approximate location or proximity of the lead and/or the setting representative, a product or service that the lead is interested in, among other examples.

The user interface 500 may also include a location information field 530. The closing representative may select the location information field 530 to input or view location information. The location information may include a location of the computing device 505. The location information field 530 may include a location of the lead. In some examples, the user interface 300 may display a map indicating the location of the lead (e.g., a lead device) or the location of the setter (e.g., a setter device). For example, one or more markers may be placed on the display of the map to indicate the location of the lead. In some examples, the location of the lead may be an approximate location of the lead. For example, a circle (e.g., with a 5 mile radius) may be displayed on the map to indicate an approximate location of the lead. Additionally or alternatively, the location information field 530 may include a proximity to the lead (e.g., the lead is 3 miles from the location of the computing device 505).

The user interface 500 may also include a financial information field 535. The closing representative may select the financial information field 535 to view or input financial information. In some examples, the financial information field 535 may display financial information such as an asking price of the lead, a market price of the lead, a bid type of the lead, among other examples. In some examples, the closing representative may review the other fields of user interface 500 and determine to place a "bid" (i.e., a lead information request). The closing representative may select the financial information field 535 and input parameters to send in a request for lead information (e.g., a bid amount, a bid type, etc.).

In some examples, the user interface 500 may also include additional fields not shown in FIG. 5. For example, the user interface 500 may include a lead score comparison field, which the closing representative may select to view the additional lead scores sent to the additional closing representatives. The closing representative may use the lead score comparison field to compare a lead score displayed in a lead score information field with the additional lead scores. In some examples, the closing representative may determine another closing representative was sent a higher lead score than the lead score displayed in the lead score information field, and may determine not to follow up on the lead. In other examples, the closing representative may determine that the lead score displayed in the lead score information field is higher than the additional lead scores, and may determine to follow up with the lead to increase a probability the lead will be successfully closed.

In some examples, the user interface 500 may include a field the closing representative may select to accept or decline the lead associated with the lead score. If the closing representative accepts the lead, the closing representative may indicate to the provider that the closing representative will attempt to close the lead (e.g., in a lead information request message). If the closing representative declines the lead, the closing representative may indicate to the provider that the closing representative will not attempt to close the lead, or may delay attempting to close the lead.

Figure 6:
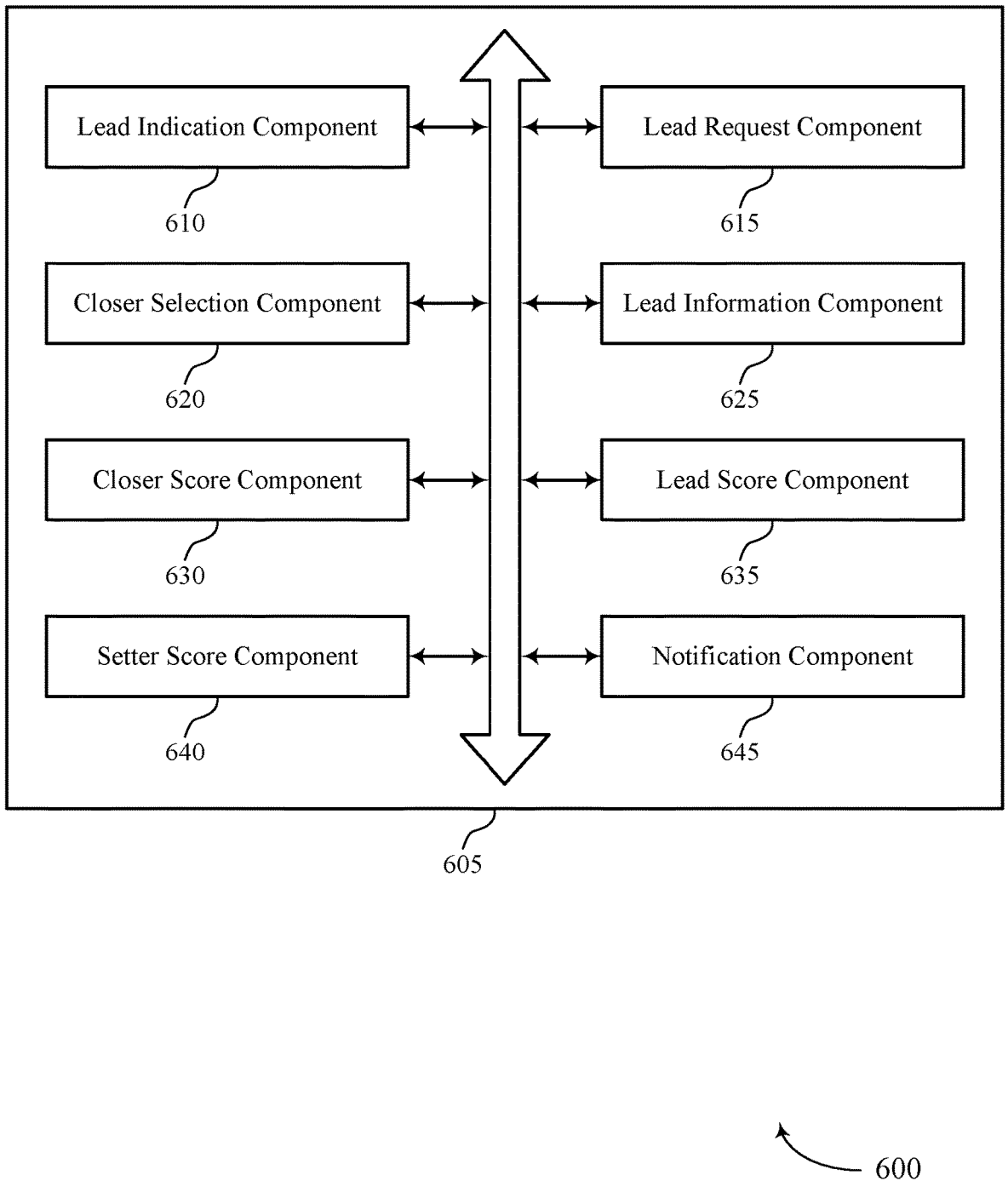
FIG. 6 illustrates a block diagram of a lead information manager that supports techniques for lead information sharing in accordance with aspects of the present disclosure.

FIG. 6 shows a block diagram 600 of a lead information manager 605 that supports techniques for lead information sharing in accordance with aspects of the present disclosure. The lead information manager 605 may be an example of aspects of a lead information manager 710 described herein. The lead information manager 605 may be part of a server, a setter device, a closer device, a lead device, or a combination thereof. The lead information manager 605 may include a lead indication component 610, a lead request component 615, a closer selection component 620, a lead information component 625, a closer score component 630, a lead score component 635, a setter score component 640, and a notification component 645. Each of these modules may communicate, directly or indirectly, with one another (e.g., via one or more buses).

The lead indication component 610 may transmit, to one or more devices associated with one or more closing representatives, a first message indicating a person identified by a setting representative, the person associated with a product or service represented by the one or more closing representatives, the first message including a score associated with the person, a score associated with the setting representative, or a combination thereof. In some cases, the first message includes an approximate location of the person, an approximate location of the setting representative, or a combination thereof.

In some examples, the lead indication component 610 may receive, from a device associated with a setting representative, a first message indicating a person identified by the setting representative, the person associated with a product or service represented by a closing representative, the first message including a score associated with the person, a score associated with the setting representative, or a combination thereof.

The lead request component 615 may receive, from a device associated with a closing representative of the one or more closing representatives, a second message indicating a request for information of the person based on transmitting the first message, the second message including a score associated with the closing representative. In some examples, the lead request component 615 may identify financial information associated with the closing representative.

In some examples, the lead request component 615 may transmit, to the device associated with the setting representative, a second message indicating a request for information of the person based on receiving the first message, the second message including the financial information and a score associated with the closing representative. In some examples, identifying the financial information includes selecting a price to pay the setting representative to send the information of the person. In some cases, the second message includes financial information associated with the closing representative, a location of the closing representative, a proximity of the closing representative to the person, an entity type of the closing representative, or a combination thereof.

The closer selection component 620 may identify that the closing representative is selected for sending the information of the person based on receiving the second message. In some examples, the closer selection component 620 may receive a set of second messages from a set of the one or more closing representatives, each of the set of messages including a price to pay the setting representative to send the information of the person, where identifying that the closing representative is selected is based on the price indicated by the second message associated with the closing representative. In some cases, the price includes a first price for receiving the information of the person, a second price for providing the good or service to the person, or a combination thereof.

In some examples, the closer selection component 620 may perform a search operation to identify the one or more closing representatives, where the search operation generates a list of the one or more closing representatives based on one or more filters, the one or more filters including a proximity threshold, an entity type, a threshold associated with the score of the setting representative, the score of the person, or a combination thereof.

In some examples, the closer selection component 620 may select the closing representative of the one or more closing representatives based on input received from the setting representative, where identifying that the closing representative is selected is based on the selecting.

The lead information component 625 may transmit, to the device associated with the closing representative, a third message indicating that the closing representative is selected and including the information of the person. In some examples, the lead information component 625 may determine the information of the person associated with the product or service based on an interaction between the person and the setting representative, where the interaction between the person and setting representative includes the setting representative identifying that the person is interested in the product or service.

In some examples, the lead information component 625 may receive, from the device associated with the setting representative, a third message indicating that the closing representative is selected and including the information of the person.

The closer score component 630 may determine the score associated with the closing representative based on a lead-closed history of the closing representative, a location of the closing representative, a proximity of the closing representative to the person, an entity type of the closing representative, or a combination thereof.

In some examples, the closer score component 630 may determine a ratio of a number of leads received by the closing representative to a number of leads closed by the closing representative. In some examples, the closer score component 630 may compare the ratio of the number of leads received to the number of leads closed with an averaged ratio, where determining the score associated with the closing representative is based on the comparing.

In some examples, the closer score component 630 may determine the score associated with the closing representative based on a lead-closed history of the closing representative, a number of leads received by the closing representative, a number of leads closed by the closing representative, a location of the closing representative, a proximity of the closing representative to the person, an entity type of the closing representative, or a combination thereof. In some cases, the lead-closed history of the closing representative includes a number of leads received by the closing representative, a number of leads closed by the closing representative, or a combination thereof.

The lead score component 635 may determine the score associated with the person based on a proximity of the person to the closing representative, a demographic characteristic, a financial characteristic, a purchase history, a preference associated with the product or service, a consumer interest, personally identifying information, financial information, a use history of the product or service, contact information, a credit history, a qualification, or a combination thereof.

The setter score component 640 may determine the score associated with the setting representative based on a lead setting history of the setting representative, a number of leads set by the setting representative, a number of leads closed associated with the number of leads set by the setting representative, a ratio of the number of leads set to the number of leads closed associated with the setting representative, or a combination thereof.

In some examples, the setter score component 640 may determine the ratio of the number of leads set to the number of leads closed. In some examples, the setter score component 640 may compare the ratio of the number of leads set to the number of leads closed with an averaged ratio.

The notification component 645 may transmit, to a device associated with the person, a fourth message indicating information of the closing representative, a request to share information of the person with the one or more closing representatives, a confirmation of sharing information of the person with the one or more closing representatives, or a combination thereof.

In some examples, the notification component 645 may receive, from the device associated with the person, a fifth message indicating a confirmation that the information of the person is allowed to be shared with the closing representative, where transmitting the third message is based on receiving the fifth message.

Figure 7:
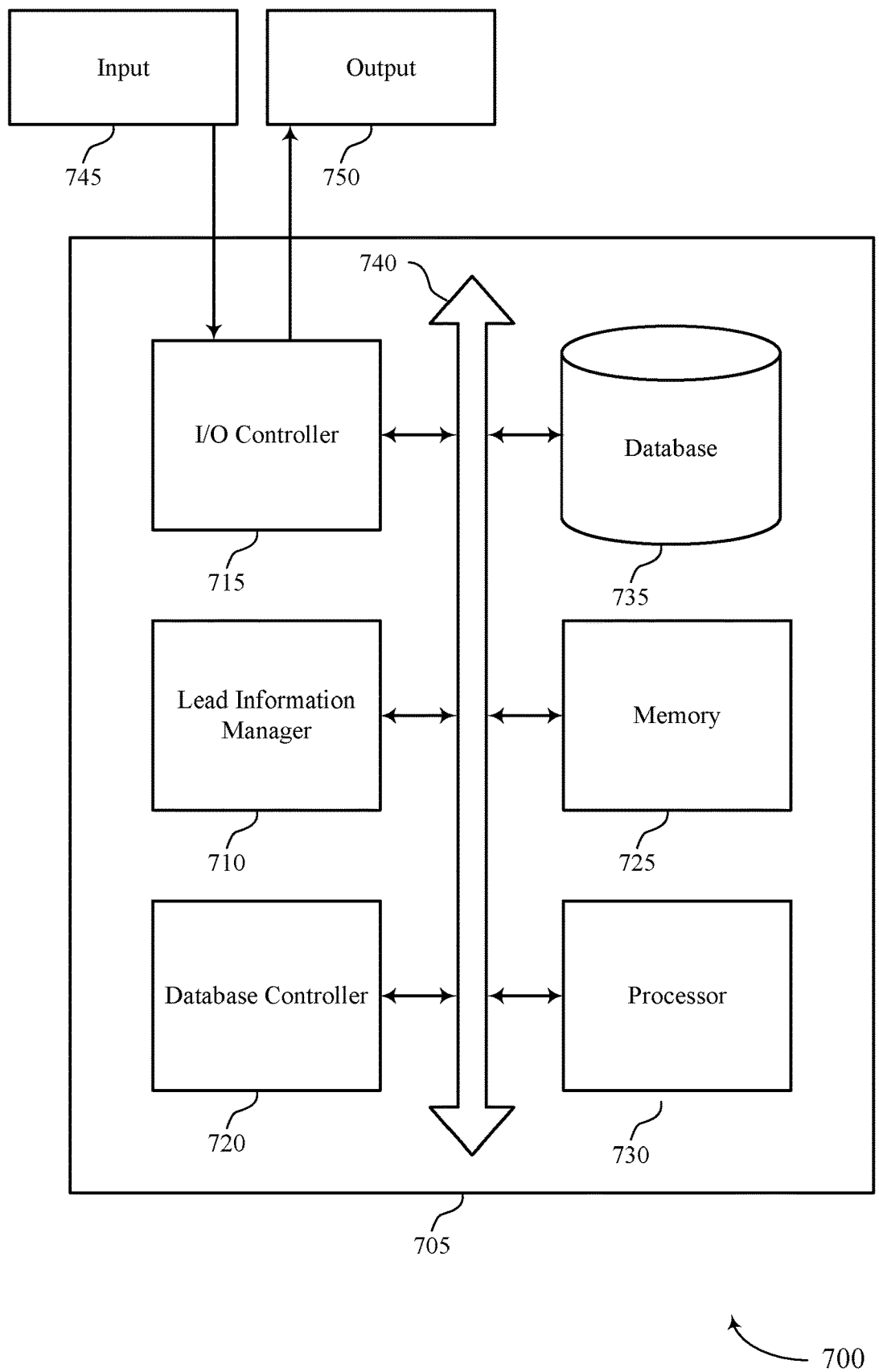
FIG. 7 illustrates a diagram of a system including a device that supports techniques for lead information sharing in accordance with aspects of the present disclosure.

FIG. 7 shows a diagram of a system 700 including a device 705 that supports techniques for lead information sharing in accordance with aspects of the present disclosure. The device 705 may be an example of a server, a setter device, a closer device, or a combination thereof as described herein. The device 705 may include components for bi-directional data communications including components for transmitting and receiving communications, including a lead information manager 710, an I/O controller 715, a database controller 720, memory 725, a processor 730, and a database 735. These components may be in electronic communication via one or more buses (e.g., bus 740).

The lead information manager 710 may be an example of a lead information manager 605 as described herein. For example, the lead information manager 710 may perform any of the methods or processes described above with reference to FIG. 6. In some cases, the lead information manager 710 may be implemented in hardware, software executed by a processor, firmware, or any combination thereof.

The I/O controller 715 may manage input signals 745 and output signals 750 for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The database controller 720 may manage data storage and processing in a database 735. In some cases, a user may interact with the database controller 720. In other cases, the database controller 720 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting techniques for lead information sharing).

Figure 8:
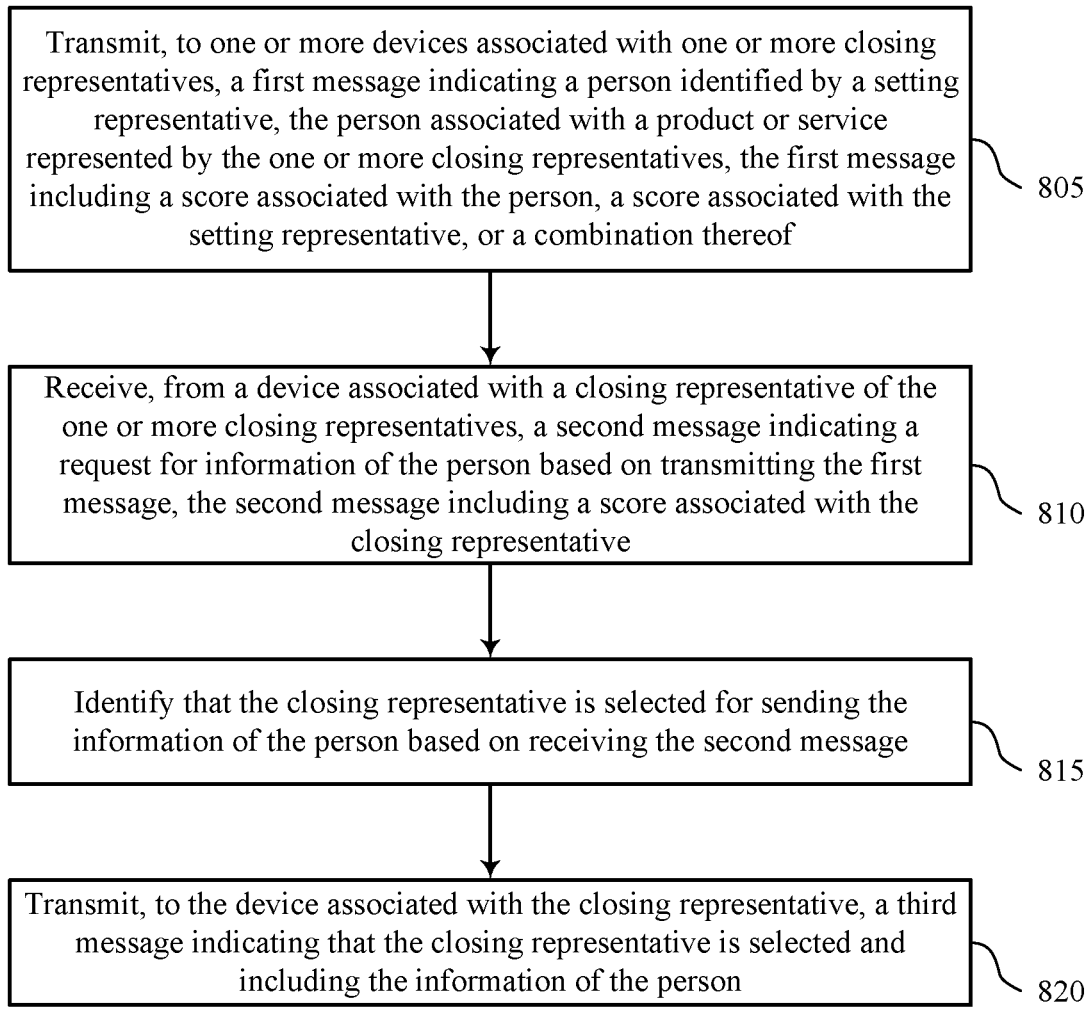
FIGS. 8 and 9 illustrate flowcharts of a method or methods that support techniques for lead information sharing in accordance with aspects of the present disclosure.

FIG. 8 shows a flowchart illustrating a method 800 that supports techniques for lead information sharing in accordance with aspects of the present disclosure. The operations of method 800 may be implemented by a lead information manager, one or more devices implementing a lead information manager, or various components as described herein. For example, the operations of method 800 may be performed by a setter device that includes a lead information manager as described with reference to FIGS. 6 and 7. In some examples, a lead information manager may execute a set of instructions to control the functional elements of the lead information manager to perform the described functions. Additionally or alternatively, a lead information manager may perform aspects of the functions described below using special-purpose hardware.

At 805, the lead information manager may transmit, to one or more devices associated with one or more closing representatives, a first message indicating a person identified by a setting representative, the person associated with a product or service represented by the one or more closing representatives, the first message including a score associated with the person, a score associated with the setting representative, or a combination thereof. The operations of 805 may be performed according to the methods described herein. In some examples, aspects of the operations of 805 may be performed by a lead indication component as described with reference to FIG. 6.

At 810, the lead information manager may receive, from a device associated with a closing representative of the one or more closing representatives, a second message indicating a request for information of the person based on transmitting the first message, the second message including a score associated with the closing representative. The operations of 810 may be performed according to the methods described herein. In some examples, aspects of the operations of 810 may be performed by a lead request component as described with reference to FIG. 6.

At 815, the lead information manager may identify that the closing representative is selected for sending the information of the person based on receiving the second message. The operations of 815 may be performed according to the methods described herein. In some examples, aspects of the operations of 815 may be performed by a closer selection component as described with reference to FIG. 6.

At 820, the lead information manager may transmit, to the device associated with the closing representative, a third message indicating that the closing representative is selected and including the information of the person. The operations of 820 may be performed according to the methods described herein. In some examples, aspects of the operations of 820 may be performed by a lead information component as described with reference to FIG. 6.

Figure 9:
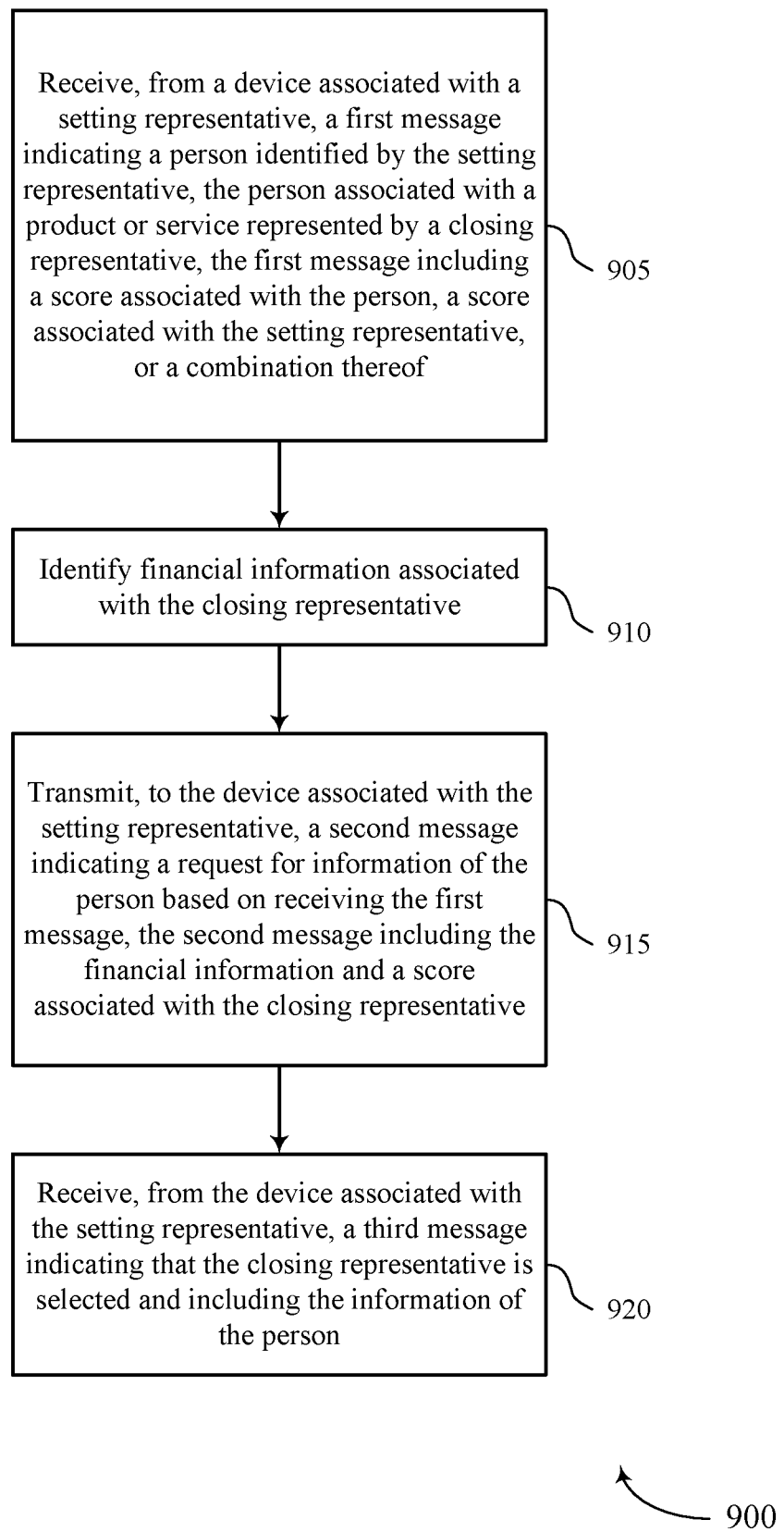

FIG. 9 shows a flowchart illustrating a method 900 that supports techniques for lead information sharing in accordance with aspects of the present disclosure. The operations of method 900 may be implemented by a lead information manager, one or more devices implementing a lead information manager, or various components as described herein. For example, the operations of method 900 may be performed by a closer device as described with reference to FIG. 6 that includes a lead information manager as described with reference to FIGS. 6 and 7. In some examples, a lead information manager may execute a set of instructions to control the functional elements of the lead information manager to perform the functions described below. Additionally or alternatively, a lead information manager may perform aspects of the functions described below using special-purpose hardware.

At 905, the lead information manager may receive, from a device associated with a setting representative, a first message indicating a person identified by the setting representative, the person associated with a product or service represented by a closing representative, the first message including a score associated with the person, a score associated with the setting representative, or a combination thereof. The operations of 905 may be performed according to the methods described herein. In some examples, aspects of the operations of 905 may be performed by a lead indication component as described with reference to FIG. 6.

At 910, the lead information manager may identify financial information associated with the closing representative. The operations of 910 may be performed according to the methods described herein. In some examples, aspects of the operations of 910 may be performed by a lead request component as described with reference to FIG. 6.

At 915, the lead information manager may transmit, to the device associated with the setting representative, a second message indicating a request for information of the person based on receiving the first message, the second message including the financial information and a score associated with the closing representative. The operations of 915 may be performed according to the methods described herein. In some examples, aspects of the operations of 915 may be performed by a lead request component as described with reference to FIG. 6.

At 920, the lead information manager may receive, from the device associated with the setting representative, a third message indicating that the closing representative is selected and including the information of the person. The operations of 920 may be performed according to the methods described herein. In some examples, aspects of the operations of 920 may be performed by a lead information component as described with reference to FIG. 6.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
    searching, by a device associated with a setting representative, for a plurality of closing representatives for potential transmission of lead information including a lead location;
    presenting, on an electronic display of the device associated with the setting representative, a user interface containing a list of the plurality of closing representatives for potential transmission of lead information;
    responsive to one or more devices associated with one or more closing representatives being within a proximity threshold of the lead location, dynamically revising, by the device associated with the setting representative, the user interface to present a revised list of the one or more closing representatives, wherein revising the user interface comprises:
        generating, by the device associated with the setting representative, a proximity score for each device of the one or more devices associated with the one or more closing representatives;
        applying, by the device associated with the setting representative, one or more weights to the proximity scores for the one or more devices associated with the one or more closing representatives and lead-closed histories associated with the one or more devices associated with the one or more closing representatives;
        generating, by the device associated with the setting representative, based on the weighted proximity scores and the weighted lead-closed histories, a closer score for each of the one or more devices associated with the one or more closing representatives;
        filtering, by the device associated with the setting representative, the presented list based on a closer score threshold;
    transmitting, from the device associated with the setting representative to the one or more devices associated with one or more closing representatives selected from the presented list of closing representatives, a first message indicating the lead information, the first message comprising a predefined time window for receiving a request for information of a person corresponding to the lead information from the one or more closing representatives before expiring;
    receiving, by the device associated with the setting representative from a device associated with a closing representative of the one or more closing representatives selected from the list of closing representatives, a second message indicating a request for the lead information based at least in part on transmitting the first message;
    in response to receiving the second message outside the predefined time window, ignoring the second message unless the closing representative is designated as a favorite closing representative; and
    in response to receiving the second message within the predefined time window, transmitting, from the device associated with the setting representative to the device associated with the closing representative, a third message indicating that the closing representative is selected and comprising the lead information.

2. The method of claim 1, further comprising determining a score associated with the closing representative based at least in part on a lead-closed history of the closing representative, a location of the closing representative, a location of the closing representative relative to the person, an entity type of the closing representative, or a combination thereof.

3. The method of claim 2, wherein the lead-closed history of the closing representative comprises a number of leads received by the closing representative, a number of leads closed by the closing representative, or a combination thereof.

4. The method of claim 2, further comprising:
    determining a ratio of a number of leads received by the closing representative to a number of leads closed by the closing representative; and
    comparing the ratio of the number of leads received to the number of leads closed with an averaged ratio, wherein determining the score associated with the closing representative is based at least in part on the comparing.

5. The method of claim 1, further comprising:
    receiving a plurality of second messages from a plurality of the one or more closing representatives, each of the plurality of messages including a price to pay the setting representative to send the information of the person, wherein identifying that the closing representative is selected is based at least in part on the price indicated by the second message associated with the closing representative.

6. The method of claim 5, wherein the price comprises a first price for receiving the information of the person, a second price for providing a good, product, or service to the person, or a combination thereof.

7. The method of claim 1, further comprising:
determining a score associated with the person based at least in part on a location of the person relative to the closing representative, a demographic characteristic, a financial characteristic, a purchase history, a preference associated with a good, product, or service, a consumer interest, personally identifying information, financial information, a use history of the product or service, contact information, a credit history, a qualification, or a combination thereof.

8. The method of claim 1, further comprising:
determining a score associated with the setting representative based at least in part on a lead setting history of the setting representative, a number of leads set by the setting representative, a number of leads closed associated with the number of leads set by the setting representative, a ratio of the number of leads set to the number of leads closed associated with the setting representative, or a combination thereof.

9. The method of claim 8, wherein determining the score associated with the setting representative further comprises:
determining the ratio of the number of leads set to the number of leads closed; and comparing the ratio of the number of leads set to the number of leads closed with an averaged ratio.

10. The method of claim 8, further comprising continually assessing the score associated with the setting representative based on new leads set by the setting representative over time and whether the leads set by the setting representative are successfully closed.

11. The method of claim 1, further comprising:
determining the information of the person associated with a good, product, or service based at least in part on an interaction between the person and the setting representative, wherein the interaction between the person and setting representative comprises the setting representative identifying that the person is interested in the product or service.

12. The method of claim 1, further comprising:
transmitting, to a device associated with the person, a fourth message indicating information of the closing representative, a request to share information of the person with the one or more closing representatives, a confirmation of sharing information of the person with the one or more closing representatives, or a combination thereof.

13. The method of claim 12, further comprising:
receiving, from the device associated with the person, a fifth message indicating a confirmation that the information of the person is allowed to be shared with the closing representative, wherein transmitting the third message is based at least in part on receiving the fifth message.

14. The method of claim 1, wherein the first message comprises an approximate location of the person, an approximate location of the setting representative, or a combination thereof.

15. The method of claim 1, wherein the second message comprises financial information associated with the closing representative, a location of the closing representative, a location of the closing representative relative to the person, an entity type of the closing representative, or a combination thereof.

16. The method of claim 1, further comprising:
selecting the closing representative of the one or more closing representatives based at least in part on input received from the setting representative, wherein identifying that the closing representative is selected is based at least in part on the selecting.

17. An apparatus, comprising:
a processor;
memory in electronic communication with the processor; and
instructions stored in the memory and executable by the processor to cause the apparatus to:
search, by a device associated with a setting representative, for a plurality of closing representatives for potential transmission of lead information including a lead location;
present, on an electronic display of the device associated with the setting representative, a user interface containing a list of the plurality of closing representatives for potential transmission of lead information;
responsive to one or more devices associated with one or more closing representatives being within a proximity threshold of the lead location, dynamically revise, by the device associated with the setting representative, the user interface to present a revised list of the one or more closing representatives, wherein revising the user interface comprises:
generate, by the device associated with the setting representative, a proximity score for each device of the one or more devices associated with the one or more closing representatives;
apply, by the device associated with the setting representative, one or more weights to the proximity scores for the one or more devices associated with the one or more closing representatives and lead-closed histories associated with the one or more devices associated with the one or more closing representatives;
generate, by the device associated with the setting representative, based on the weighted proximity scores and the weighted lead-closed histories, a closer score for each of the one or more devices associated with the one or more closing representatives;
filter, by the device associated with the setting representative, the presented list based on a closer score threshold;
transmit, from the device associated with the setting representative to the one or more devices associated with one or more closing representatives selected from the presented list of the closing representatives, a first message indicating the lead information, the first message comprising a predefined time window for receiving a request for information of a person corresponding to the lead information from the one or more closing representatives before expiring;
receive, by the device associated with the setting representative from a device associated with a closing representative of the one or more closing representatives selected from the list closing representatives, a second message indicating a request for the lead information based at least in part on transmitting the first message;

in response to receiving the second message outside the predefined time window, ignore the second message unless the closing representative is designated as a favorite closing representative; and in response to receiving the second message within the predefined time window; transmit, from the device associated with the setting representative to the device associated with the closing representative, a third message indicating that the closing representative is selected and comprising the lead information.

18. A system, comprising:
a server;
a device associated with a setting representative and communicable with the server; and
one or more devices associated with one or more closing representatives and communicable with the server;
the device associated with the setting representative to:
search, by a device associated with a setting representative, for a plurality of closing representatives for potential transmission of lead information including a lead location;

present, on an electronic display of the device associated with the setting representative, a user interface containing a list of the plurality of closing representatives for potential transmission of lead information;

responsive to one or more devices associated with one or more closing representatives being within a proximity threshold of the lead location, dynamically revise, by the device associated with the setting representative, the user interface to present a revised list of the one or more closing representatives, wherein revising the user interface comprises:

generate, by the device associated with the setting representative, a proximity score for each device of the one or more devices associated with the one or more closing representatives;

apply, by the device associated with the setting representative, one or more weights to the proximity scores for the one or more devices associated with the one or more closing representatives and lead-closed histories associated with the one or more devices associated with the one or more closing representatives;

generate, by the device associated with the setting representative, based on the weighted proximity scores and the weighted lead-closed histories, a closer score for each of the one or more devices associated with the one or more closing representatives;

filter, by the device associated with the setting representative, the presented list based on a closer score threshold;

transmit, from the device associated with the setting representative to the one or more devices associated with one or more closing representatives selected from the presented list of closing representatives, a first message indicating the lead information, the first message comprising a predefined time window for receiving a request for information of a person corresponding to the lead information from the one or more closing representatives before expiring;

receive, by the device associated with the setting representative from a device associated with a closing representative of the one or more closing representatives selected from the list of closing representatives, a second message indicating a request for the lead information based at least in part on transmitting the first message;

in response to receiving the second message outside the predefined time window, ignore the second message unless the closing representative is designated as a favorite closing representative; and in response to receiving the second message within the predefined time window, transmit, from the device associated with the setting representative to the device associated with the closing representative, a third message indicating that the closing representative is selected and comprising the lead information.

19. The system of claim 18, wherein the dynamic revision considers at least one selected from a group comprising: a lead-closed history of the closing representative, a number of leads received by the closing representative, a number of leads closed by the closing representative, a location of the closing representative, or a combination thereof.

20. The system of claim 18, wherein the second message includes a price offered to the setting representative to send the information of the person.

* * * * *